(12) United States Patent

Venugopal et al.

(10) Patent No.: US 12,640,794 B2

(45) Date of Patent: May 26, 2026

(54) SIGNALING FOR CONDITIONAL CHANNEL STATE INFORMATION REPORTING

(71) Applicant: QUALCOMM Incorporated, San Diego, CA (US)

(72) Inventors: Kiran Venugopal, Green Brook, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 18/508,621

(22) Filed: Nov. 14, 2023

(65) Prior Publication Data

US 2025/0158677 A1 May 15, 2025

(51) Int. Cl.
*H04B 7/06* (2006.01)
*H04L 5/00* (2006.01)

(52) U.S. Cl.
CPC ......... *H04B 7/0626* (2013.01); *H04B 7/0632* (2013.01); *H04B 7/0639* (2013.01); *H04L 5/0053* (2013.01)

(58) Field of Classification Search
CPC ............................ H04B 7/0626; H04L 5/0053
See application file for complete search history.

(56) References Cited

U.S. PATENT DOCUMENTS

| | | |
|---|---|---|
| 2020/0383119 A1 | 12/2020 | Sun et al. |
| 2022/0376757 A1* | 11/2022 | Pezeshki ............... H04L 5/0057 |

OTHER PUBLICATIONS

International Search Report and Written Opinion—PCT/US2024/046911—ISA/EPO—Apr. 11, 2025.
Partial International Search Report—PCT/US2024/046911—ISA/EPO—Jan. 2, 2025.

* cited by examiner

*Primary Examiner* — Siming Liu

(74) *Attorney, Agent, or Firm* — Loza & Loza, LLP

(57) ABSTRACT

An apparatus receives a Channel State Information (CSI) reporting setting. The CSI reporting setting includes an identification of uplink reporting resources and at least one condition to be satisfied before the apparatus transmits a CSI report on the uplink reporting resources. The apparatus receives at least one CSI reference signal (CSI-RS) and transmits the CSI report using the uplink reporting resources in response to the at least one CSI-RS directly or indirectly resulting in the at least one condition being satisfied. A network entity transmits a CSI reporting setting including an identification of uplink reporting resources and at least one condition to be satisfied at an apparatus before receiving a CSI report from the apparatus on the uplink reporting resources. The network entity transmits at least one CSI-RS and receives, from the apparatus, the CSI report using the uplink reporting resources in response to transmitting the at least one CSI-RS.

26 Claims, 13 Drawing Sheets

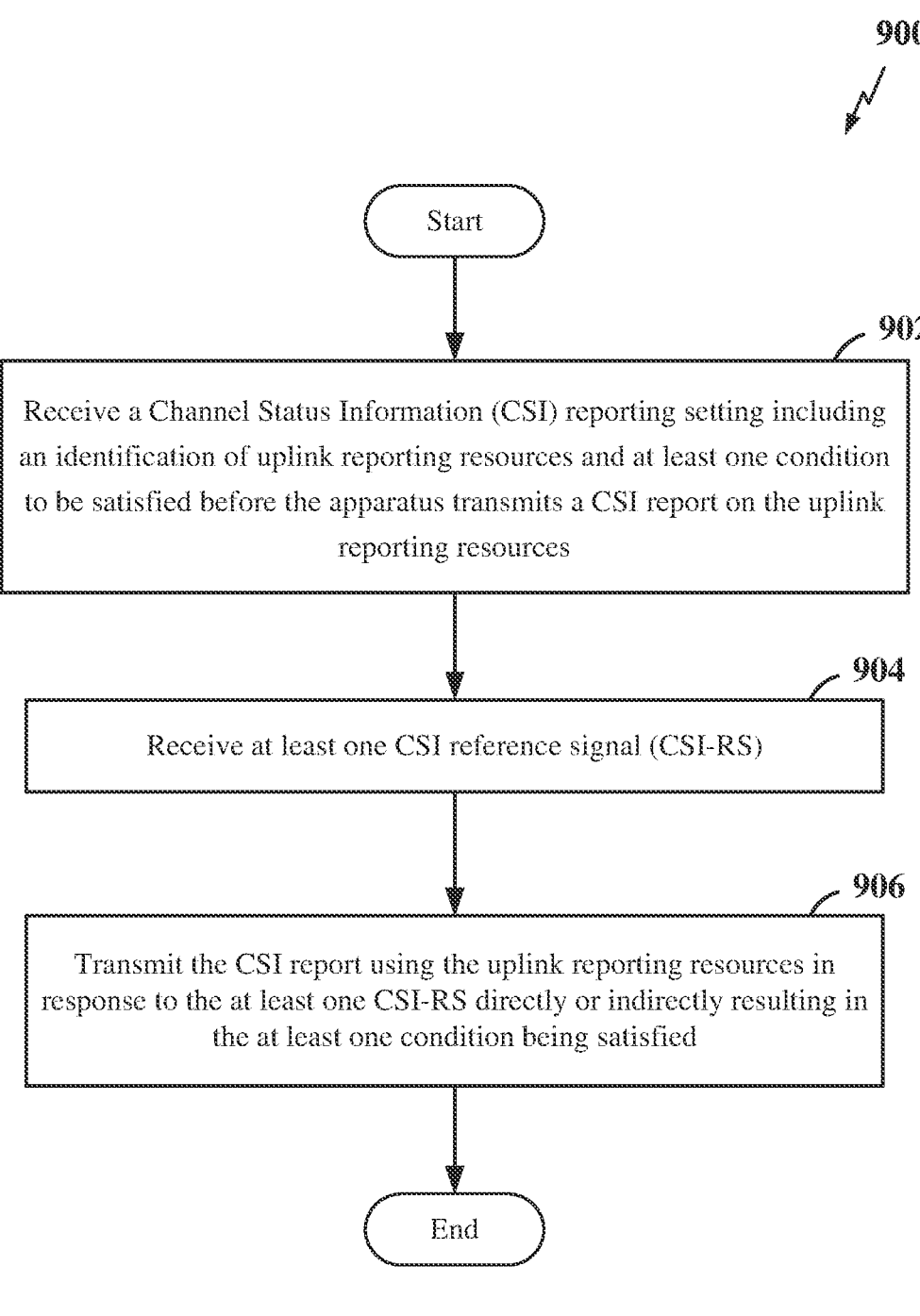

900

Start

902

Receive a Channel Status Information (CSI) reporting setting including an identification of uplink reporting resources and at least one condition to be satisfied before the apparatus transmits a CSI report on the uplink reporting resources

904

Receive at least one CSI reference signal (CSI-RS)

906

Transmit the CSI report using the uplink reporting resources in response to the at least one CSI-RS directly or indirectly resulting in the at least one condition being satisfied End

FIG. 9

SIGNALING FOR CONDITIONAL CHANNEL STATE INFORMATION REPORTING

TECHNICAL FIELD

This disclosure relates generally to wireless communication and, more specifically, to signaling for conditional channel state information reporting.

INTRODUCTION

Wireless communication between a user equipment (e.g., a scheduled entity, an apparatus) and a network entity (e.g., a scheduling entity, a gNB) requires the exchange of radio signals in noisy channels. Channel conditions can change dynamically for several reasons, including but not limited to weather, transient obstructions, and interference from other user equipment and network entities. In order to optimize the use of the channels, accurate and up-to-date channel state information (CSI) is needed by the network entity. Channel state information may include the parameters of rank indicator (RI), precoding matrix indicator (PMI), and channel quality indicator (CQI), to name a few. To obtain channel state information, the network entity configures user equipment with CSI reporting mechanisms, such as periodic channel state information reporting, semi-persistent channel state information reporting, and aperiodic channel state information reporting. These reporting mechanisms have benefits in terms of at least their ease of configuration and drawbacks in terms of at least the overhead required to effectuate the various reports and waste of resources realized in their operation in some situations. The user equipment measures reference signals transmitted by the network entity and determines the RI, PMI, and CQI values to report to the network entity. Reporting this information may provide the network entity with an understanding of how the channel changes over time. Still, channel state information reporting is predominantly a network-initiated and network-controlled function. Developing methodology to reduce configuration overhead and wasteful resource usage would be advantageous.

BRIEF SUMMARY OF SOME EXAMPLES

The systems, methods, and devices of this disclosure each have several innovative aspects, no single one of which is solely responsible for the desirable attributes disclosed herein.

In one example, a method at an apparatus is described. The method includes receiving a Channel State Information (CSI) reporting setting including an identification of uplink reporting resources and at least one condition to be satisfied before the apparatus transmits a CSI report on the uplink reporting resources, receiving at least one CSI reference signal (CSI-RS), and transmitting the CSI report using the uplink reporting resources in response to the at least one CSI-RS directly or indirectly resulting in the at least one condition being satisfied.

In another example, an apparatus is described. The apparatus includes one or more memories and one or more processors. The one or more memories and the one or more processors are configured to, individually or collectively, based at least in part on information stored in the one or more memories: receive a Channel State Information (CSI) reporting setting including an identification of uplink reporting resources and at least one condition to be satisfied before the apparatus transmits a CSI report on the uplink reporting resources, receive at least one CSI reference signal (CSI-RS), and transmit the CSI report using the uplink reporting resources in response to the at least one CSI-RS directly or indirectly resulting in the at least one condition being satisfied.

In one example, a method at a network entity is described. The method includes transmitting a Channel State Information (CSI) reporting setting including an identification of uplink reporting resources and at least one condition to be satisfied before receiving a CSI report on the uplink reporting resources. The transmitting may be from the network entity to an apparatus (e.g., a user equipment, a scheduled entity). The method also includes transmitting at least one CSI reference signal (CSI-RS) and receiving the CSI report using the uplink reporting resources in response to the transmitting the at least one CSI-RS.

In another example, a network entity is described. The network entity includes one or more memories and one or more processors. The one or more memories and the one or more processors are configured to, individually or collectively, based at least in part on information stored in the one or more memories: transmit a Channel State Information (CSI) reporting setting including an identification of uplink reporting resources and at least one condition to be satisfied before receiving a CSI report on the uplink reporting resources, transmit at least one CSI reference signal (CSI-RS), and receive the CSI report using the uplink reporting resources in response to the transmitting the at least one CSI-RS.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 9 is a flow chart illustrating an example process of wireless communication at an apparatus according to some aspects of the disclosure.

Like reference numbers and designations in the various drawings indicate like elements.

DETAILED DESCRIPTION

Figure 1:
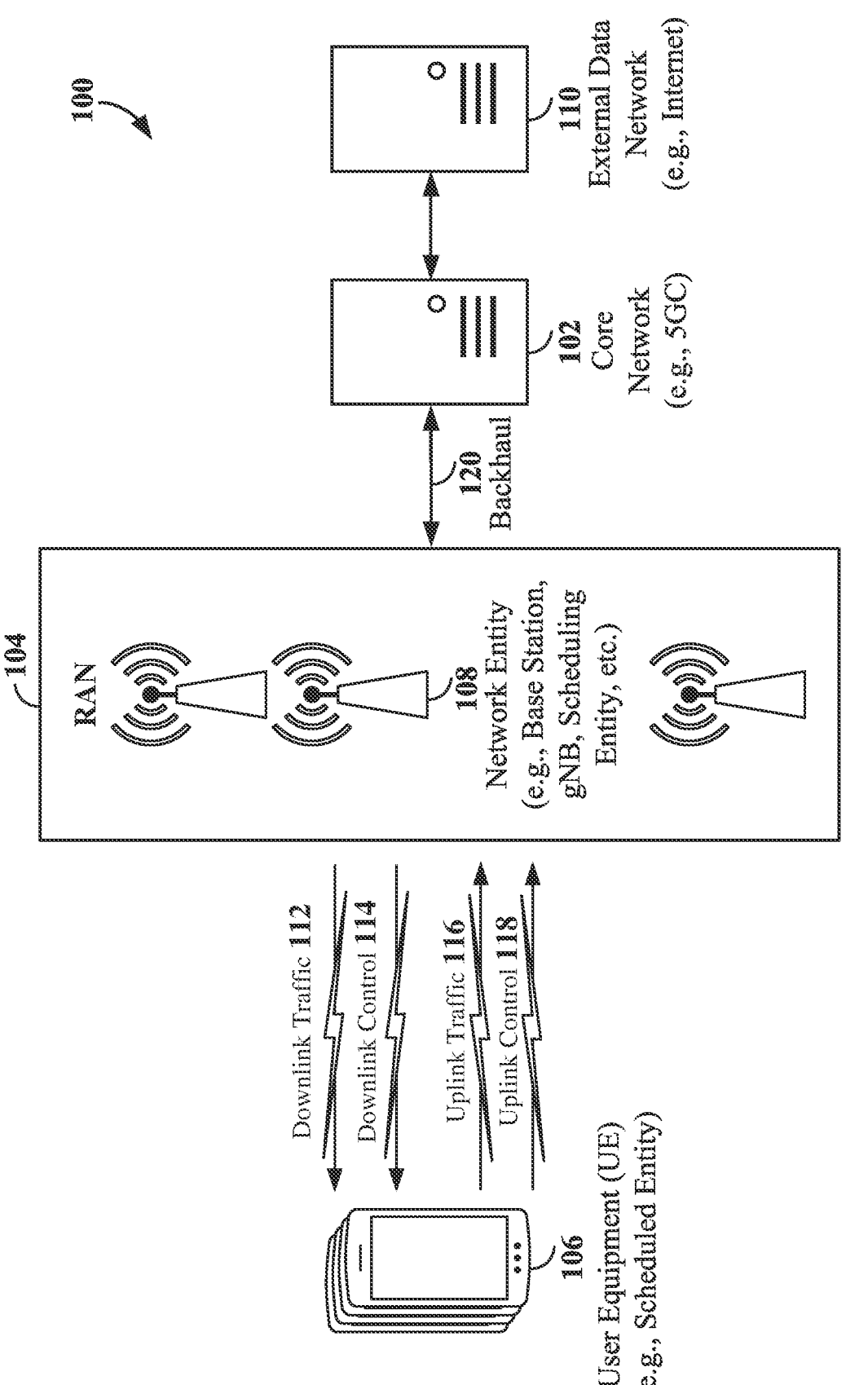
FIG. 1 is a schematic illustration of an example of a wireless communication system according to some aspects of the disclosure.

The detailed description set forth below in connection with the appended drawings is directed to some particular examples for the purpose of describing innovative aspects of this disclosure. However, a person having ordinary skill in the art will readily recognize that the teachings herein can be applied in a multitude of different ways. Some or all of the described examples may be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system, or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to persons having ordinary skill in the art that these concepts may be practiced without these specific details. In some examples, well-known structures and components are shown in block diagram form in order to avoid obscuring such concepts.

While aspects and examples are described in this application by illustration to some examples, persons having ordinary skill in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or user equipment (UE)), end-user devices, etc. of varying sizes, shapes, and constitution.

Described herein are methods and hardware implementations of the methods that are drawn toward a use of conditions to trigger the transmission of CSI reports when channel state changes, thereby reducing the wasteful practice of continually transmitting unchanged CSI reports when channel conditions are stable. Various ways to inform a network entity of the availability of resources, by repurposing resources configured for CSI reporting when channel conditions are stable are provided.

The various concepts presented throughout this disclosure may be implemented across a broad variety of telecommunication systems, network architectures, and communication standards. Referring now to FIG. 1, as an illustrative example without limitation, a schematic illustration of an example of a wireless communication system 100 according to some aspects of the disclosure is presented. The wireless communication system 100 includes three interacting domains: a core network 102, a radio access network (RAN) 104, and a user equipment (UE) 106. By virtue of the wireless communication system 100, the UE 106 (also referred to herein as a wireless communication device) may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of network entities 108. Broadly, a network entity may be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In some examples, a network entity may be a network element in a radio access network responsible for radio transmission and reception in one or more cells to or from a UE. In different technologies, standards, or contexts, a network entity may variously be referred to by persons having ordinary skill in the art as a base transceiver station (BTS), a radio base station, a base station, a radio transceiver, a transceiver function, a basic service set (BSS), an extended service set (ESS), an access point (AP), a Node B (NB), an eNode B (eNB), a gNode B (gNB), a transmission and reception point (TRP), a scheduling entity, a network entity, or some other suitable terminology. In some examples, a network entity may include two or more TRPs that may be collocated or non-collocated. Each TRP may communicate on the same or different carrier frequency within the same or different frequency band. In examples where the RAN 104 operates according to both the LTE and 5G NR standards, one of the network entities may be an LTE network entity, while another network entity may be a 5G NR network entity.

The RAN 104 is further illustrated supporting wireless communication for multiple mobile apparatuses. A mobile apparatus may be referred to as user equipment (UE) in 3GPP standards, but may also be referred to by persons having ordinary skill in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, a scheduled entity, or some other suitable terminology. A UE 106 may be an apparatus (e.g., a scheduled entity, a user equipment, a wireless communications device, a mobile communication device) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smartphone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smartwatch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data and/or relevant QoS for transport of critical service data.

Wireless communication between the RAN 104 and the UE 106 may be described as utilizing an air interface. Transmissions over the air interface from a network entity (e.g., similar to network entity 108) to one or more UEs (e.g., similar to UE 106) may be referred to as downlink (DL) transmission. In accordance with certain aspects of the present disclosure, the term downlink may refer to a point-to-multipoint transmission or a point-to-point transmission (e.g., groupcast, multicast, or unicast) originating at a network entity (e.g., network entity 108). Another way to describe this scheme may be to use the term broadcast channel multiplexing. Transmissions from a UE (e.g., UE 106) to a network entity (e.g., network entity 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, where a network entity (e.g., a network entity 108) allocates resources for communication among some or all devices and equipment within its service area or cell. Within the present disclosure, as discussed further below, the network entity (e.g., network entity 108) may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the network entity 108.

Network entities 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, the network entity 108 may broadcast downlink traffic 112 (also referred to as downlink data traffic) to one or more UEs 106. Broadly, the network entity 108 may be a node or device responsible for scheduling traffic (e.g., data traffic, user data traffic) in a wireless communication network, including the downlink traffic 112 and, in some examples, uplink traffic 116 (also referred to as uplink data traffic) from one or more UEs 106 to the network entity 108. On the other hand, the UE 106 (e.g., the scheduled entity) may be a node or device that receives downlink control 114 information, including but not limited to scheduling information (e.g., a grant), synchronization or timing information, or other control information from another entity in the wireless communication network such as the network entity 108. The UE 106 may further transmit uplink control 118 information, including but not limited to a scheduling request or feedback information, or other control information to the network entity 108.

In addition, the uplink control 118 information and/or downlink control 114 information and/or uplink traffic 116 and/or downlink traffic 112 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, the network entity 108 may include a backhaul interface (not shown) for communication with a backhaul portion 120 of the wireless communication system 100. The backhaul portion 120 may provide a link between a network entity 108 and the core network 102. Further, in some examples, a backhaul network may provide interconnection between respective network entities 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5G core (5GC)). In other examples, the core network 102 may be configured according to a 4G evolved packet core (EPC) or any other suitable standard or configuration.

Figure 2:
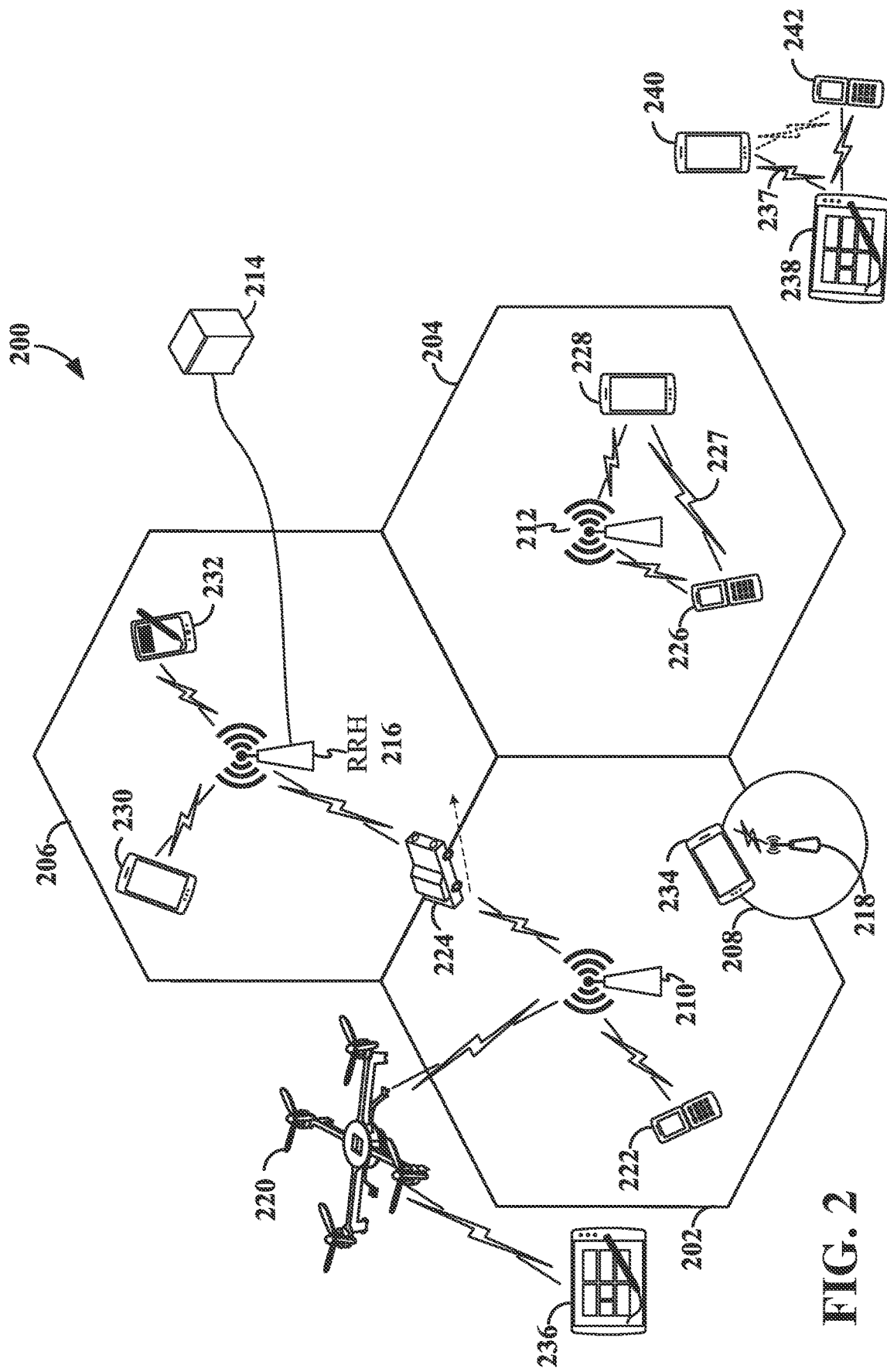
FIG. 2 is a schematic illustration of an example of a radio access network according to some aspects of the disclosure.

Referring now to FIG. 2, as an illustrative example without limitation, a schematic illustration of an example of a radio access network (RAN) 200 according to some aspects of the disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or network entity. FIG. 2 illustrates cells 202, 204, 206, and 208, each of which may include one or more sectors (not shown). A sector is a sub-area of a cell. All sectors within one cell are served by the same network entity. A radio link within a sector can be identified by a single logical identification belonging to that sector. In a cell that is divided into sectors, the multiple sectors within a cell can be formed by groups of antennas, with each antenna responsible for communication with UEs in a portion of the cell.

Various network entity arrangements can be utilized. For example, in FIG. 2, two network entities, referred to as base station 210 and base station 212, are shown in cells 202 and 204. A third network entity, referred to as base station 214, is shown controlling a remote radio head (RRH) 216 in cell 206. That is, a network entity can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a small cell, a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of network entities (e.g., base stations, gNBs, TRPs, scheduling entities) and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the network entity 108 described above and illustrated in FIG. 1.

FIG. 2 further includes an unmanned aerial vehicle (UAV) 220, which may be a drone, quadcopter, octocopter, etc. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, UE 234 may be in communication with base station 218, and UE 236 may be in communication with mobile base station 220. In some examples, the UEs 222, 224, 226, 228, 230, 232, 234, 236, 238, 240, and/or 242 may be the same as or similar to the one or more UEs 106 described above and illustrated in FIG. 1. In some examples, the UAV 220 may be a mobile network entity and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station (e.g., a network entity). In other examples, two or more UEs (e.g., UEs 226 and 228) within the coverage area of a network entity (e.g., base station 212) may also communicate sidelink signals 227 over a direct link (sidelink) without conveying that communication through the network entity (e.g., base station 212). In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error-correcting block code. In a typical block code, an information message or sequence is split up into code blocks (CBs), and an encoder (e.g., a CODEC) at the transmitting device then mathematically adds redundancy to the information message. The exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a network entity (e.g., an aggregated or disaggregated base station, gNB, eNB, TRP, scheduling entity, etc.), or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell (e.g., cell 202) to the geographic area corresponding to a neighbor cell (e.g., cell 206). When the signal strength or quality from the neighbor cell exceeds that of its serving cell for a given amount of time, the UE 224 may transmit a reporting message to its serving network entity (e.g., base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, where technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into the mid-band frequencies. In addition, higher frequency bands are currently being explored to extend 5G NR operation beyond 52.6 GHZ. For example, three higher operating bands have been identified as frequency range designations FR4-a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different subbands of the carrier bandwidth. This type of full-duplex communication may be referred to herein as subband full-duplex (SBFD), also known as flexible duplex.

Deployment of communication systems, such as 5G new radio (NR) systems, may be arranged in multiple manners with various components or constituent parts. In a 5G NR system, or network, a network entity, a network entity, a mobility element of a network, a radio access network (RAN) node, a core network entity, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
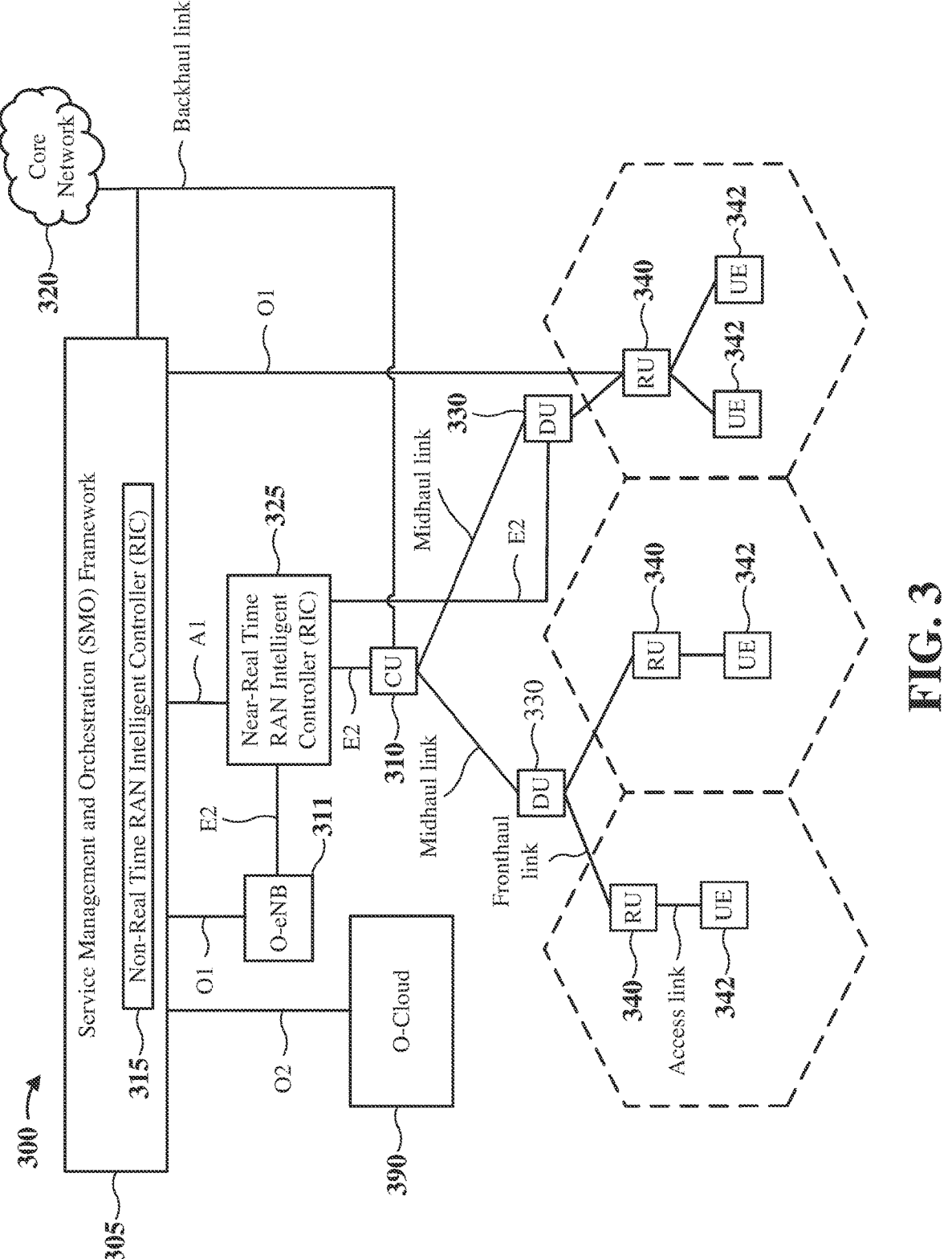
FIG. 3 is a schematic illustration of an example of a disaggregated base station architecture according to some aspects of the disclosure.

FIG. 3 is a schematic illustration of an example disaggregated base station 300 architecture according to some aspects of the disclosure. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 342 via one or more radio frequency (RF) access links. In some implementations, the UE 342 may be simultaneously served by multiple RUs 340. UE 342 may be the same or similar to any of the UEs or scheduled entities illustrated and described in connection with FIG. 1 and FIG. 2, for example.

Each of the units, i.e., the CUS 310, the DUs 330, the RUs 340, as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter, or a transceiver (such as a radio frequency (RF) transceiver), configured to receive or transmit signals, or both, over a wireless transmission medium to one or more of the other units.

In some aspects, the CU 310 may host one or more higher-layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation, and demodulation, or the like) depending, at least in part, on a functional split, such as those defined by the 3$^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 342. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUS 340 and Near-RT RICs 325. In some implementations, the SMO Framework 305 can communicate with a hardware aspect of a 3G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

Various aspects of the present disclosure will be described with reference to an OFDM waveform, schematically illustrated in FIG. 4. It should be understood by persons having ordinary skill in the art that the various aspects of the present disclosure may be applied to an SC-FDMA waveform in substantially the same way as described hereinbelow. That is, while some examples of the present disclosure may focus on an OFDM link for clarity, it should be understood that the same principles may be applied as well to SC-FDMA waveforms.

Figure 4:
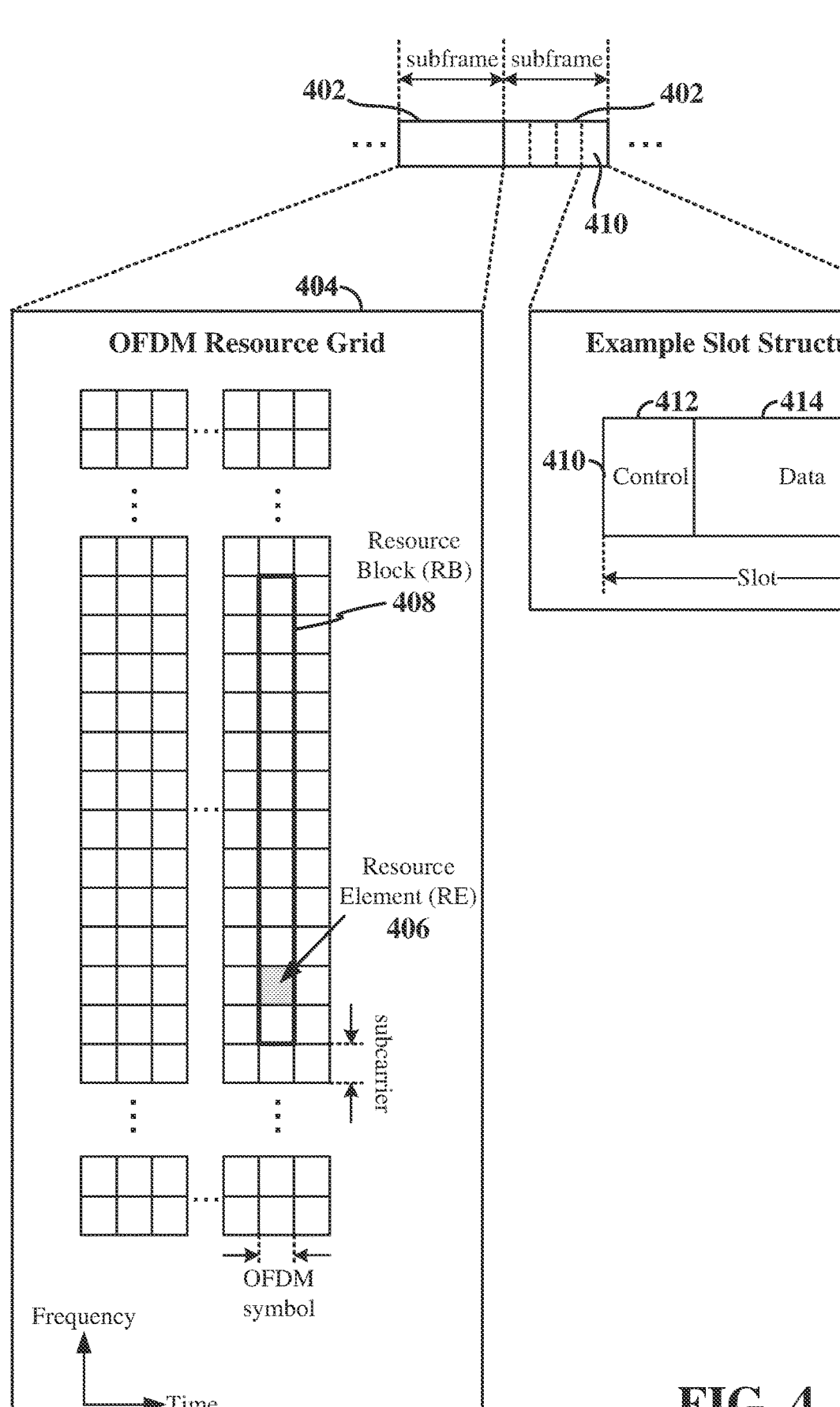
FIG. 4 is an expanded view of an exemplary subframe, showing an orthogonal frequency division multiplexing (OFDM) resource grid according to some aspects of the disclosure.

Referring now to FIG. 4, an expanded view of an exemplary subframe 402 is illustrated, showing an OFDM resource grid. However, persons having ordinary skill in the art will readily appreciate, the physical (PHY) transmission structure for any particular application may vary from the example described here, depending on any number of factors. Here, time is depicted in the horizontal direction with units of OFDM symbols, and frequency is depicted in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain.

A set of continuous or discontinuous resource blocks may be referred to herein as a Resource Block Group (RBG), subband, or bandwidth part (BWP). A set of subbands or BWPs may span the entire bandwidth. Scheduling of wireless communication devices (e.g., V2X devices, sidelink devices, or other UEs, hereinafter generally referred to as UEs) for downlink, uplink, or sidelink transmissions may involve scheduling one or more resource elements 406 within one or more subbands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a network entity (e.g., an aggregated or disaggregated base station, gNB, eNB, TRP, scheduling entity, etc.) or may be self-scheduled by a UE/sidelink device implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. An additional example may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of slot 410 illustrates that the slot 410 includes a control region 412 and a data region 414. In general, the control region 412 may carry control channels, and the data region 414 may carry data channels. In some examples, a Uu slot (e.g., slot 410) may contain all DL, all UL, or at least one DL portion and at least one UL portion. The structures illustrated in FIG. 4 are merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a network entity, UE, or other similar device) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the network entity may allocate one or more REs 406 (e.g., within the control region 412) of the slot 410 to carry DL control information including one or more DL control channels, such as a physical downlink control channel (PDCCH), to one or more UEs (e.g., scheduled entities). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to persons having ordinary skill in the art, where the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The network entity may further allocate one or more REs 406 (e.g., in the control region 412 or the data region 414) of the Uu slot 410 to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 4, 10, 20, 50, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A network entity may transmit other system information (OSI) as well.

In a UL transmission, the UE (e.g., scheduled entity) may utilize one or more REs 406 of the Uu slot 410 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, a measurement report (e.g., a Layer 1 (L1) measurement report), or any other suitable UCI.

In addition to control information, one or more REs 406 (e.g., within the data region 414) of the Uu slot 410 may be allocated for data traffic. Such data traffic may be carried on one or more traffic channels, such as, for a DL transmission, a physical downlink shared channel (PDSCH); or for a UL transmission, a physical uplink shared channel (PUSCH). In some examples, one or more REs 406 within the data region 414 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, sidelink MAC-CEs may be transmitted in the data region 414 of the slot 410. In addition, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number (e.g., a quantity) of bits of information, may be a controlled parameter based on the modulation and coding scheme (MCS) and the number of RBs in a given transmission.

The channels or carriers described above in connection with FIGS. 1-4 are not necessarily all of the channels or carriers that may be utilized between devices, and persons of ordinary skill in the art will recognize that other channels or carriers may be utilized in addition to those illustrated, such as other traffic, control, and feedback channels.

Figure 5:
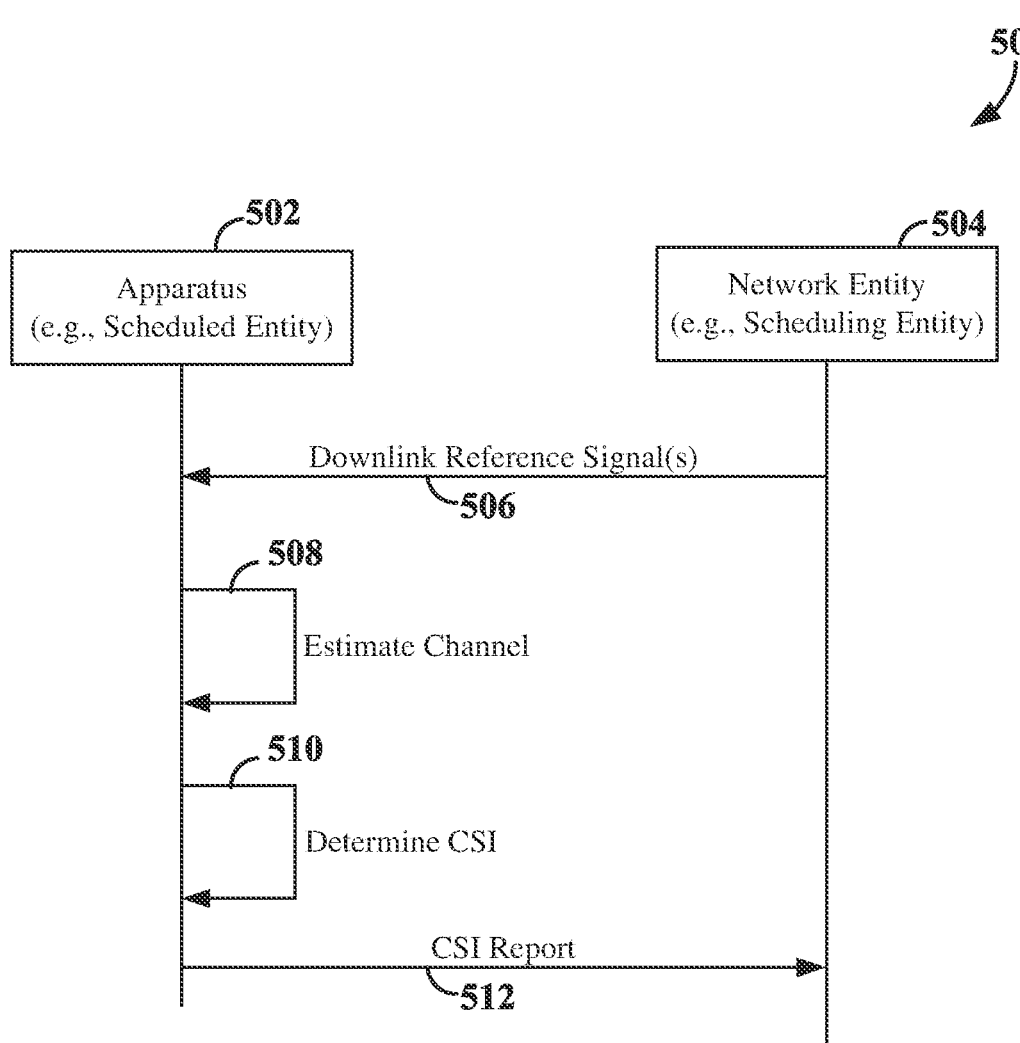
FIG. 5 is a signaling diagram illustrating exemplary signaling between a user equipment and a network entity for channel state information reporting according to some aspects of the disclosure.

FIG. 5 is a signaling diagram illustrating exemplary signaling between an apparatus 502 (e.g., a scheduled entity, a user equipment, a wireless communication device, a mobile communication device) and a network entity 504 (e.g., a scheduling entity, a base station, an aggregated or disaggregated base station, an eNB, a gNB, a TRP) for channel state information reporting according to some aspects of the disclosure. The apparatus 502 may correspond, for example, to any of the scheduled entities or UEs shown in FIGS. 1, 2, and/or 3. The network entity 504 may correspond, for example, to any of the scheduling entities, base stations, aggregated or disaggregated base stations, eNBs, gNBs, or TRPs shown in FIGS. 1, 2, and/or 3.

At 506, the network entity 504 may transmit a downlink reference signal, such as a CSI-RS, to the apparatus 502. In some examples, the downlink reference signal may include a plurality of downlink reference signals. Each downlink reference signal may be transmitted via a respective CSI resource. CSI resources may include time-frequency resources, along with a beam direction (spatial direction), within which a particular downlink reference signal can be transmitted. In addition, each downlink reference signal may include a number of pilots allocated within the respective CSI resource. In some examples, the different spatial directions of the CSI resources may support MIMO (e.g., spatial multiplexing).

At 508, the apparatus 502 can estimate the downlink wireless channel from the downlink reference signal(s). For example, the apparatus 502 may measure the signal to interference plus noise ration (SINR) of one or more of the downlink reference signals to obtain a downlink channel estimate of the downlink wireless channel.

At 510, for example, the apparatus 502 may determine the CSI. For example, the apparatus 502 may determine a rank indicator (RI), precoding matrix indicator (PMI), channel quality indicator (CQI), and layer indicator (LI) from the downlink channel estimate. The CQI may include an index (e.g., a CQI index) ranging, for example, from 0 to 16. The CQI index may indicate, for example, the highest MCS at which the Block Error Rate (BLER) of the channel does not exceed 10%. Once selected, the RI, PMI, LI, and CQI index can be fed back in a CSI report. For example, at 512, the apparatus 502 may transmit the CSI report, including the selected CQI, along with the RI, PMI, LI, and/or strongest layer indication (SLI), to the network entity 504.

The network entity 504 and apparatus 502 may support different types of CSI reports (including L1 measurement reports) and/or different types of measurements. To distinguish between the different types of CSI reports and different types of measurements, the network entity 504 may configure the apparatus 502 with one or more CSI report settings.

Figure 6:
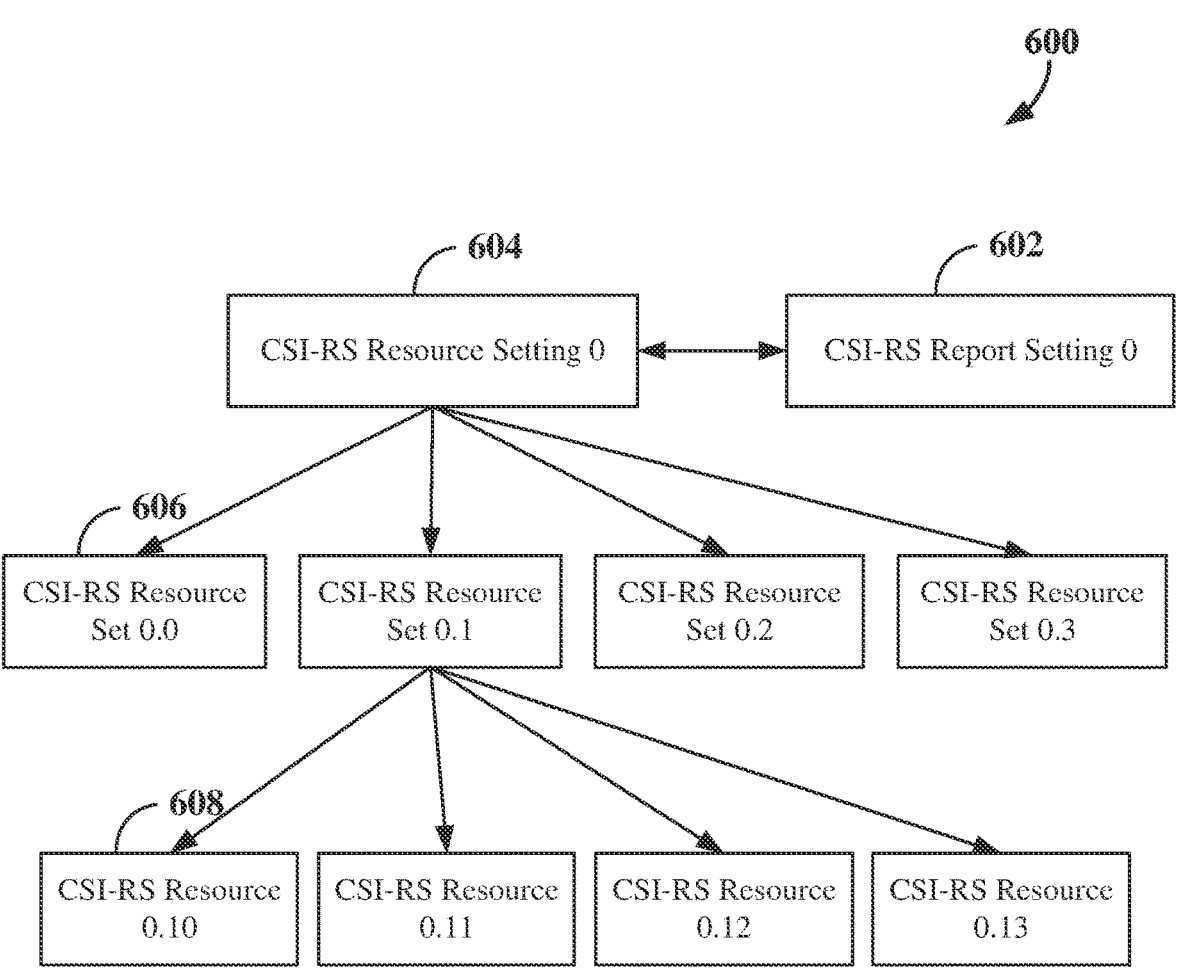
FIG. 6 illustrates an exemplary channel state information (CSI) resource mapping to support different report/measurement configurations according to some aspects of the disclosure.

FIG. 6 illustrates an exemplary CSI resource mapping to support different report/measurement configurations according to some aspects of the disclosure. The CSI resource mapping includes CSI report setting 602, CSI resource settings 604, CSI resource sets 606, and CSI resources 608. Each CSI resource setting 604 includes one or more CSI resource sets 606, and each CSI resource set 606 includes one or more CSI resources 608. In the example shown in FIG. 6, a single CSI resource setting (e.g., CSI resource setting 0) is illustrated. However, it should be understood that any suitable number of CSI resource settings 604 may be supported.

Each CSI report setting 602 may include a reportQuantity that indicates, for example, the specific CSI values and granularity thereof (e.g., wideband/sub-band CQI, PMI, RI, LI, etc.), or L1 parameters (e.g., L1-RSRP (a.k.a. RSRP), L1-SINR (a.k.a. SINR)) to include in a CSI report. The CSI report setting may further indicate a periodicity of the CSI report.

For example, the CSI report setting may indicate that the report should be generated periodically, aperiodically, or semi-persistently. For aperiodic CSI report settings, the CSI report may be sent on the PUSCH and may or may not be multiplexed with uplink data. For periodic CSI report settings, the CSI report may be sent on the PUCCH (e.g., a short PUCCH or a long PUCCH). For semi-persistent CSI report settings, the CSI report may be sent on the PUCCH or the PUSCH. For example, semi-persistent CSI reports sent on the PUCCH may be activated or deactivated using a medium access control (MAC) control element (MAC-CE). Semi-persistent CSI reports sent on the PUSCH may be triggered using downlink control information (DCI) scrambled with a semi-persistent scheduling-cell-Radio Network Temporary Identifier (SPS-C-RNTI). The DCI triggering the semi-persistent CSI reporting may further allocate semi-persistent resources and an MCS for the CSI report. Semi-persistent CSI report settings may further support Type II codebooks and a minimum periodicity of 5 ms. In some examples, periodic and semi-persistent CSI report settings may support the following periodicities: {5, 10, 20, 40, 80, 160, and 320} slots. CSI report settings may further include a respective priority and other suitable parameters.

Each CSI report setting 602 may further be linked to a CSI resource setting 604 indicating the CSI resources 608 applicable to the CSI report setting 602. Each CSI resource setting 604 may be associated with a particular time domain behavior of reference signals. For example, each CSI resource setting 604 may include periodic, semi-persistent, or aperiodic CSI resources 608. For periodic and semi-persistent CSI resource settings 604, the number of configured CSI resource sets 606 may be limited to one. In general, the CSI resource settings 604 that may be linked to a particular CSI report setting 602 may be limited by the time domain behavior of the CSI resource setting 604 and the CSI report setting 602. For example, an aperiodic CSI report setting 602 may be linked to periodic, semi-persistent, or aperiodic CSI resource setting 604. However, a semi-persistent CSI report setting 602 may be linked to only periodic or semi-persistent CSI resource settings 604. In addition, a periodic CSI report setting 602 may be linked to only a periodic CSI resource setting 604.

Each CSI resource set 606 may be associated with a CSI resource type. For example, CSI resource types may include non-zero-power (NZP) CSI-RS resources, SSB resources, or channel state information interference measurement (CSI-IM) resources. Thus, each CSI resource set 606 includes a list of CSI resources 608 of a particular CSI resource type. In addition, each CSI resource set 606 may further be associated with one or more of a set of frequency resources (e.g., a bandwidth and/or OFDM symbol(s) within a slot), a particular set of ports, a power, or other suitable parameters.

Each CSI resource 608 may indicate a particular beam (e.g., one or more ports), frequency resource, and OFDM symbol on which the reference signal may be measured by the wireless communication device. For example, each CSI-RS of the CSI resources 608 may indicate an RE on which a CSI-RS pilot or SSB transmitted from a particular set of ports (e.g., on a particular beam) may be measured. In the example shown in FIG. 6, CSI-RS resource set 0.1 includes four CSI-RS resources (CSI-RS resource 0.10, CSI-RS resource 0.11, CSI-RS resource 0.12, and CSI-RS resource 0.13). Each CSI resource 608 may further be indexed by a respective beam identifier (ID). The beam ID may identify not only the particular beam (e.g., ports) but also the resources on which the reference signal may be measured. For example, the beam ID may include a CSI-RS resource indicator (CRI) or a SSB resource indicator (SSBRI).

The network entity may configure the UE with one or more CSI report settings 602 and CSI resource settings 604 via, for example, radio resource control (RRC) signaling. For example, the network entity may configure the UE with a list of periodic CSI report settings indicating an associated CSI resource set that the UE may utilize to generate periodic CSI reports. As another example, the network entity may configure the UE with a list of aperiodic CSI report settings in a CSI-AperiodicTriggerStateList. Each trigger state in the CSI-AperiodicTriggerStateList may include a list of aperiodic CSI report settings indicating the associated CSI resource sets for channel (and optionally interference) measurement. As another example, the network entity may configure the UE with a list of semi-persistent CSI report settings in a CSI-SemiPersistentOnPUSCH-TriggerStateList. Each trigger state in the CSI-SemiPersistentOn-PUSCH-TriggerStateList may include one CSI report setting indicating the associated CSI resource set. The network entity may then trigger one or more of the aperiodic or semi-persistent trigger states using, for example, DCI. As indicated above, a MAC-CE may be used to activate or deactivate a semi-persistent CSI report setting for a CSI report sent on the PUCCH.

In networks comprised of both fixed and mobile apparatus (e.g., a scheduled entity, a user equipment, a wireless communication device, a mobile communication device), channel conditions between the apparatus and a network entity (e.g., a scheduling entity, a base station, an aggregated or disaggregated base station, an eNB, a gNB, a TRP) may change dynamically due to several reasons. For example, a channel between a fixed apparatus and a network entity may vary due to a weather event, such as rain or snow, precipitating within the geographic region between the apparatus and the network entity. As another example, an obstruction, such as a truck or other vehicle, may traverse the geographic region between the apparatus and the network entity, causing the channel to vary. In another example, transient interference may be present in terms of radio signals being intermittently used in and around the same radio frequency bands as used by the apparatus and the network entity. Accurate and up-to-date channel state information (CSI) is appropriate, relevant, and/or important to a network entity. Accurate and up-to-date CSI facilitates the network entity's efficient scheduling and resource utilization in connection with communication in a network, such as a network utilizing new network (e.g., from a network entity). An SP-CSI report may be conveyed from an apparatus to a network entity on a PUCCH or a PUSCH. Resources and a modulation and coding scheme (MCS) for SP-CSI on PUCCH may be allocated. Resources and an MCS for SP-CSI on PUSCH may be allocated via DCI. Once configured, the SP-CSI report may be activated by a MAC-CE. After activation, the SP-CSI report is transmitted by the apparatus to the network entity periodically, in accordance with a periodicity configured for the SP-CSI report.

A third CSI reporting mechanism may be referred to as aperiodic channel state information (AP-CSI). An AP-CSI report may be configured to an apparatus from the network (e.g., from a network entity). An AP-CSI report may be conveyed from an apparatus to a network entity on a PUSCH. The AP-CSI report may be triggered by an uplink grant and may be multiplexed on the PUSCH with or without data.

Table 1 below summarizes the aspects associated with P-CSI reporting, SP-CSI reporting, and AP-CSI reporting.

TABLE 1

| Triggering and Activation of CSI Reporting for CSI-RS Configurations | | | |
|---|---|---|---|
| CSI-RS Configuration | Periodic CSI Reporting | Semi-Persistent CSI Reporting | Aperiodic CSI Reporting |
| Periodic CSI-RS | No dynamic triggering or activation. | For reporting on PUCCH, the UE receives an activation command, as described in clause 6.1.3.16 of TS 38.321; for reporting on PUSCH, the UE receives triggering on DCI. | Triggered by DCI; additionally, subselection indication as described in clause 6.1.3.13 of TS 38.321 is possible as defined in Clause 5.2.1.5.1 of TS 38.214. |
| Semi-Persistent CSI-RS | Not supported. | For reporting on PUCCH, the UE receives an activation command, as described in clause 6.1.3.16 of TS 38.321; for reporting on PUSCH, the UE receives triggering on DCI. | Triggered by DCI; additionally, subselection indication as described in clause 6.1.3.13 of TS 38.321 is possible as defined in Clause 5.2.1.5.1 of TS 38.214. |
| Aperiodic CSI-RS | Not supported. | Not supported. | Triggered by DCI; additionally, subselection indication as described in clause 6.1.3.13 of TS 38.321 is possible as defined in Clause 5.2.1.5.1 of TS 38.214. | radio (NR) and/or other telecommunications standards as propagated by the Third Generation Partnership Project (3GPP) and/or other standard-setting bodies.

In NR, three CSI reporting mechanisms are defined. The three CSI reporting mechanisms are controlled by the network. The three CSI reporting mechanisms are introduced herein in no particular order. A first CSI reporting mechanism may be referred to as periodic channel state information (P-CSI). A P-CSI report may be conveyed from an apparatus (e.g., a scheduled entity, a user equipment, a wireless communication device, a mobile communication device) to a network entity on a PUCCH. The P-CSI report may be configured to an apparatus from the network (e.g., from a network entity) via radio resource control (RRC) signaling. Once configured and activated, the apparatus transmits the P-CSI report periodically.

A second CSI reporting mechanism may be referred to as semi-persistent channel state information (SP-CSI). A SP-CSI report may be configured to an apparatus from the Benefits or drawbacks may be associated with each of the three types of channel state information. For example, P-CSI reporting is readily configured, and configuration overhead is minimal compared to configuring SP-CSI and AP-CSI reporting. However, resources allocated for P-CSI reporting may be wasteful if channel conditions do not change from slot to slot or frame to frame (e.g., do not rapidly change in time). For example, and without any intent to limit any aspects described in the disclosure, as between a stationary UE and a gNB on a clear day without transient obstructions between the stationary UE and the gNB and without interference affecting the channel between the stationary UE and the gNB, the content of a P-CSI report will be unchanged from report to report (transmitted to the gNB from the UE according to the periodicity configured in connection with the P-CSI reporting setting). The P-CSI reporting may be considered wasteful in this non-limiting example because the resources used for the P-CSI reporting may be used for other uplink and/or downlink communications. In such an example, to reduce the arguable waste of resources used for P-CSI reporting, the network may adapt the periodicity of the P-CSI reporting based on UE feedback, other heuristics, implementation of the UE, or any combination thereof.

AP-CSI may utilize DCI overhead to configure AP-CSI reporting. Additionally, AP-CSI reporting may implicate timeline constraints (e.g., on communications other than AP-CSI reporting) in connection with the generation and transmission of AP-CSI reports. However, the network can use AP-CSI if the network requires UE feedback on channel state at any moment (e.g., network may use the AP-CSI reporting option in case the network wants or requires UE feedback urgently).

As described in connection with the exemplary aspects described herein, SP-CSI reporting offers a good trade-off between P-CSI reporting and AP-CSI reporting but cannot use an AP-CSI resource for measurement reporting.

Because a UE has realistic knowledge of the channel, according to aspects described herein, the UE may be given one or more options to report CSI in a flexible manner. Providing the UE with such options may result in less CSI reporting (compared to P-CSI, AP-CSI, or SP-CSI) in general. However, based on its realistic knowledge, the UE may determine that a need to increase the frequency of reporting exists. Although frequent reporting may involve more overhead, the increased frequency may be needed for high mobility scenarios and ultra reliable low latency communication (URLLC) type applications.

Some UE-initiated CSI reporting mechanisms have been proposed. However, current implementations and/or mechanisms that may allow UE-triggered CSI reports have some limitations. As a first example, a UE may be configured with multiple P-CSI and SP-CSI report settings with different reporting periodicities. In such an example, a UE may select one setting based on local conditions; however, this may cause increased resource overhead and/or resource wastage since PUCCH resources are (pre-) assigned for P-CSI and SP-SCI reporting. As a second example, a UE may request a modification of P-CSI or SP-CSI report setting parameters, such as reporting periodicity. However, this may involve higher latency due to a need for the UE to transmit its request (i.e., UL request transmission), followed by an ACK/NACK reception before the P-CSI or SP-SCI report is transmitted in UL resources with the requested parameters. As a third example, a UE may request an AP-CSI measurement/reporting instance; however, latency and delay due to at least AP-CSI triggering, measurement, and reporting are implicated in connection with the UE requesting an AP-CSI measurement/reporting instance.

According to aspects described herein, and different from the UE-initiated CSI reporting mechanisms described above, aspects of the disclosure consider network-controlled, condition-based CSI reporting by a UE. In one aspect, a network entity may configure P-CSI resources for measurement and P-CSI reporting resources and a UE may flexibly select reporting resources based on pre-configured conditions.

In one example, P-CSI measurement configuration and reporting configuration (via RRC) may be described. This example may also apply to SP-CSI measurement configuration and reporting configuration after activation. In the example, along with the reporting configuration (e.g., reporting setting), the network includes an information element (IE) that includes one or more conditions. Such an IE (referred to hereinafter alternatively as a "Conditional CSI IE" and an "information element associated with conditional CSI reporting") may not be present in the standards to date; accordingly, the IE may be a new IE with respect to other IEs present in the standards to date. The term Conditional CSI IE is utilized for case of reference and is non-limiting. Other terms may be used to refer to the IE referred to herein as the Conditional CSI IE.

The one or more conditions may be required to be satisfied before the UE transmits the report (e.g., the one or more conditions may be conditions precedent). In other words, the one or more conditions may be required to be satisfied prior to the UE transmitting a P-CSI report (or an SP-CSI report in examples where SP-CSI measurement configuration and SP-CSI reporting configuration apply).

Examples of conditions may include, but are not limited to one or more of:

a change to a rank indication (RI) (also referred to as an RI change);

a change in a pre-coding matrix indicator (PMI) by more than x indices in a PMI matrix codebook (where x is an integer); and a change to a channel quality indicator (CQI) (also referred to as a CQI change) by more than n (where n is an integer).

In the above non-exclusive list of conditions, RI may be a value that indicates a number of layers for downlink transmissions with the present channel conditions. The RI may also be considered as an indication of a maximum number of uncorrelated paths that a downlink transmission may utilize. The RI may indicate a degree of interference between the multiple antennas of a plurality of antennas in a MIMO configuration. A maximum value of RI would indicate that the signals between antenna pairs have no correlation to each other; that is, they do not interfere with each other. PMI and CQI may be based on RI. Examples of the PMI matrix codebook referred to above may include, but are not limited to, any one of Type I single-panel codebooks, Type I multi-panel codebooks, Type II codebooks, and Enhanced Type II codebooks, all as defined in standard documents, such as the 3GPP technical standard 38.214.

In one example, a network entity may configure CSI reporting resources for a given UE subject to one or more of the exemplary conditions described above with the highest periodicities (e.g., where a periodicity of 5 slots is higher than a periodicity of 10 slots) to allow for the given UE to have fast UE reporting opportunities. In other words, the network entity may configure CSI reporting resources for a first UE whose measurements of channel conditions indicate satisfaction of one or more of the exemplary conditions described above with a periodicity that is shorter than a periodicity of CSI reporting resources configured for a second UE whose measurements of channel conditions do not indicate satisfaction of one or more of the exemplary conditions described above. Such a configuration may allow the first UE to transmit CSI reports with less time between successive reports than the CSI reports of the second UE. Such a decrease in periodicity may be useful as satisfaction of one or more of the exemplary conditions described above may indicate a channel with dynamically changing conditions. The lack of satisfaction of one or more of the exemplary conditions described above may indicate a channel with conditions that have not changed, or not changed markedly, from conditions tested with a previous evaluation of channel state.

In one example, in connection with an SP-CSI reporting configuration, the Conditional CSI IE may be activated jointly with the reporting activation MAC-CE or separately from the reporting activation MAC-CE. In other words, according to a first aspect, the reporting activation MAC-CE, upon activating the SP-CSI reporting, may activate the testing of the one or more conditions specified in the Conditional CSI IE (and may, therefore, result in SP-CSI reports being transmitted if the one or more conditions were satisfied—and not being transmitted if the one or more conditions were not satisfied). However, according to a second aspect, the reporting activation MAC-CE may activate SP-CSI reporting without regard to implementing any testing of the one or more conditions specified in the Conditional CSI IE; another MAC-CE may be used to activate the Conditional CSI IE by activating the testing of the one or more conditions specified in the Conditional CSI IE and transmitting the SP-CSI report upon satisfaction of the one or more conditions (and not transmitting the SP-CSI report if the one or more conditions were not satisfied).

According to some aspects, a given condition (e.g., an RI change) may be implicit (e.g., such as when the given condition is specified in a standard or captured in a specification) so that UE is required to use the CSI reporting resource when the given condition is met (e.g., without regard to activation of the Conditional CSI IE by a MAC-CE).

According to some aspects, a UE may request a reporting configuration that includes one or more conditions (such as those that may be specified in a Conditional CSI IE) from the network. According to such an aspect, and in one example, if the one or more conditions conveyed in the requested reporting configuration are or are not satisfied, respectively, the UE may determine not to use a given P-CSI reporting instance in order to save power.

In examples where a reporting resource (a resource utilized for uplink) is not utilized by a UE, the unutilized resource may be utilized for another purpose by the network (e.g., the unutilized resource may be leveraged by the network).

Figure 7:
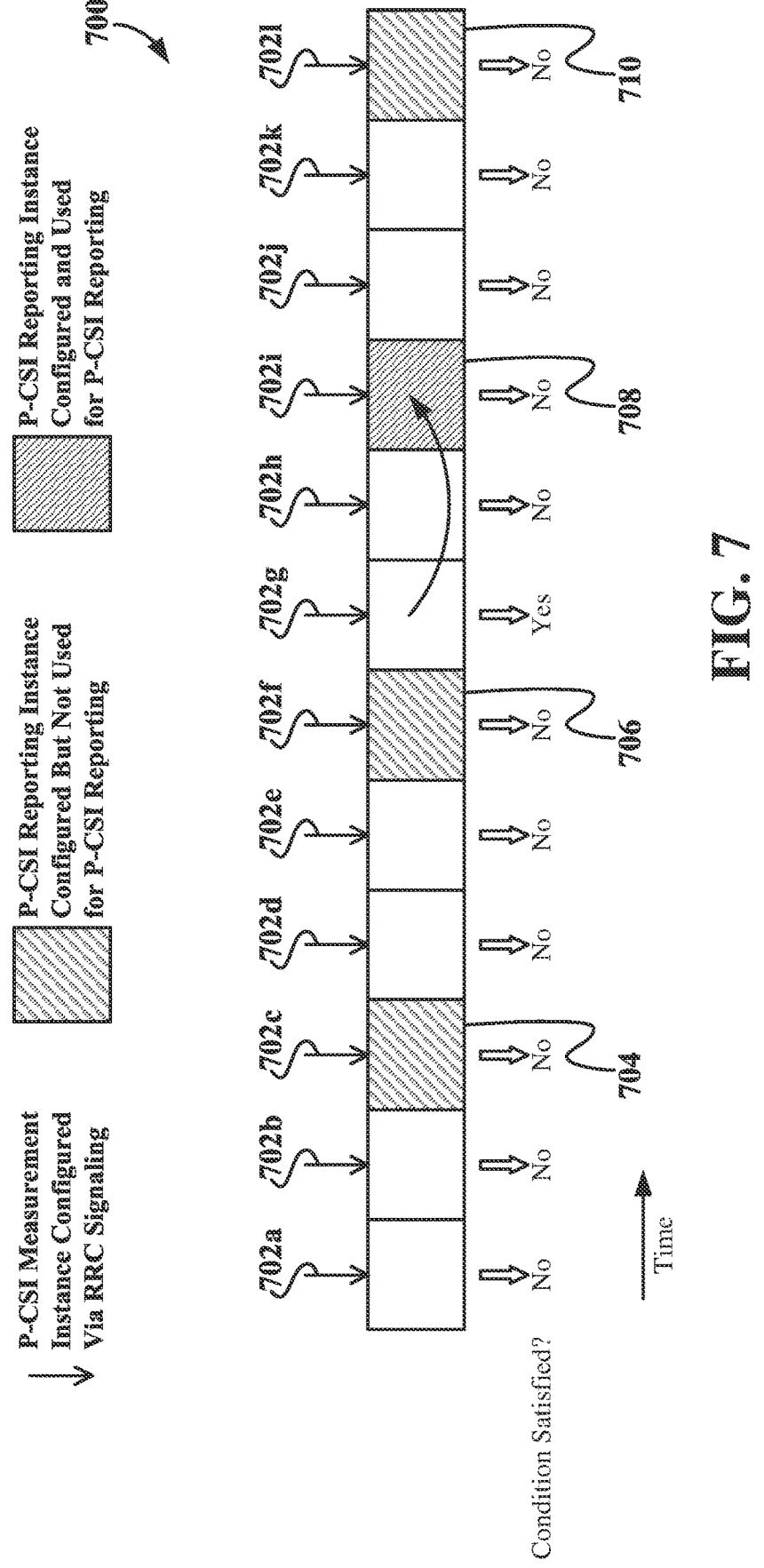
FIG. 7 is an illustration of a window of time illustrating a plurality of periodic channel state information reference signal (P-CSI RS) measurement instances and P-CSI reporting instances according to some aspects of the disclosure.

FIG. 7 is an illustration of a window of time 700 illustrating a plurality of P-CSI RS measurement instances 702a-702n and P-CSI reporting instances 704, 706, 708, 710 according to some aspects of the disclosure. In the example of FIG. 7, the window of time 700 is divided into 12 contiguous time segments for ease of illustration and not limitation. The window of time 700 could be divided into 12 non-contiguous time segments and still be within the scope of the disclosure. Furthermore, in the illustration of FIG. 7, a pattern between the plurality of P-CSI RS measurement instances 702a-702n and the plurality of time segments follows a one-to-one correspondence; however, this pattern is for ease of illustration and not limitation. Other patterns, such as, for example and without limitation, a repetitive series represented by a first P-CSI RS measurement instance in a first time segment, no P-CSI RS measurement instance in a second time segment, and a second P-CSI RS measurement instance in a third time segment, etc. is within the scope of the disclosure. Additionally, it is noted that the quantity 12 is randomly selected for ease of illustration and not limitation. In some examples, each time segment may be a slot; however, other measures for each time segment are within the scope of the disclosure.

In the example of FIG. 7, the plurality of P-CSI RS measurement instances 702a-702n (each represented by a single-line downward pointing arrow) may be configured by a network entity (e.g., any of the scheduling entities, base stations, aggregated or disaggregated base stations, eNBs, gNBs, TRPs as shown and described in connection with FIGS. 1, 2, 3, and/or 5) to a UE (e.g., any of the apparatus, UEs, scheduled entities as shown and described in connection with FIGS. 1, 2, 3, and/or 5) via RRC signaling. In other words, the network entity may inform the UE of the time-frequency resources in which to receive (e.g., listen for) the P-CSI RSs. Similarly, the network entity may configure the plurality of P-CSI reporting instances 704, 706, 708, 710 (e.g., reporting opportunities) to the UE via RRC signaling. In other words, the network entity may inform the UE of the time-frequency resources in which the UE may transmit a P-CSI report to the network entity. Furthermore, a Conditional CSI IE, as described above and in accordance with some aspects of the disclosure, may be conveyed by the network entity to the UE via a MAC-CE, for example. As described above, the one or more conditions specified in the Conditional CSI IE may include but are not limited to an RI change, a change in a pre-coding matrix indicator (PMI) by more than x indices in a PMI matrix codebook, and/or a change to a channel quality indicator (CQI) by more than n.

According to aspects described herein, and as illustrated in the example of FIG. 7, if the one or more condition(s) included in the Conditional CSI IE is or are not satisfied in the P-CSI measurement instances before (and including) a next upcoming P-CSI reporting instance, the UE does not transmit a P-CSI report during that P-CSI reporting instance. Turning to FIG. 7 as an illustrative example for explanatory purposes, if, at the P-CSI measurement instances 702a, 702b, and 702c, the UE determines that the condition(s) in a Conditional CSI IE are not satisfied (see the words "No" in "Conditions Satisfied" row of FIG. 7 corresponding to the P-CSI measurement instances 702a, 702b, and 702c), the UE does not transmit a P-CSI report during the P-CSI reporting instance 704. The absence of a P-CSI report transmitted at the P-CSI reporting instance 704 is represented by right-to-left downward lines in the time segment corresponding to the P-CSI reporting instance 704.

Similarly, if, at the P-CSI measurement instances 702d, 702e, and 702f, the UE determines that the condition(s) in the Conditional CSI IE are not satisfied (see the words "No" in "Conditions Satisfied" row of FIG. 7 corresponding to the P-CSI measurement instances 702d, 702e, and 702f), the UE does not transmit a P-CSI report during the P-CSI reporting instance 706. The absence of a P-CSI report transmitted at the P-CSI reporting instance 706 is represented by right-to-left downward lines in the time segment corresponding to the P-CSI reporting instance 706.

However, if, at the P-CSI measurement instance 702g, the UE determines that the condition(s) in the Conditional CSI IE are satisfied (see the word "Yes" in the "Conditions Satisfied" row of FIG. 7 corresponding to the P-CSI measurement instance 702g), the UE does transmit a P-CSI report during the P-CSI reporting instance 708. The transmission of the P-CSI report at the P-CSI reporting instance 708 is represented by left-to-right downward lines in the time segment corresponding to the P-CSI reporting instance 708. Furthermore, a curved arrow beginning in the time segment corresponding to the P-CSI measurement instance 702g and terminating in the P-CSI reporting instance 708 represents that the P-CSI report transmitted in the P-CSI reporting instance 708 reflects CSI information obtained by measurement of the P-CSI RS in connection with the P-CSI measurement instance 702g.

As graphically depicted in FIG. 7, during the P-CSI measurement instances 702h and 702i, the UE determined that the condition(s) in the Conditional CSI IE were not satisfied (see the words "No" in "Conditions Satisfied" row of FIG. 7 corresponding to the P-CSI measurement instances 702h and 702i), the P-CSI report conveyed during the P-CSI reporting instance 708 may, accordingly, not include P-CSI reporting material associated with the P-CSI measurement instances 702h and 702i. The absence of P-CSI reporting material associated with the P-CSI measurement instances 702*h* and 702*i* is represented by an absence of curved arrows beginning in the time segments corresponding to the P-CSI measurement instances 702*h* and 702*i* and terminating in the P-CSI reporting instance 708.

Turning now to the P-CSI measurement instances 702*j*, 702*k*, and 702*l*, if the UE determines that the condition(s) in the Conditional CSI IE are not satisfied (see the words "No" in "Conditions Satisfied" row of FIG. 7 corresponding to the P-CSI measurement instances 702*d*, 702*e*, and 702*f*), the UE does not transmit a P-CSI report during the P-CSI reporting instance 710. The absence of a P-CSI report transmitted at the P-CSI reporting instance 710 is represented by right-to-left downward lines in the time segment corresponding to the P-CSI reporting instance 710.

In some examples (such as the examples related to P-CSI reporting instances 704, 706, and 710), and as influenced by the selection of the conditions provided in a Conditional CSI IE, an apparatus need not be expected to always use the resources that are configured to the UE for CSI reporting in association with the Conditional CSI IE. Accordingly, a network entity may utilize these resources for other purposes. The other purposes may include but are not limited to the use of the resources for downlink to the UE or for other UEs' uplinks. However, as it is the UE that performs measurements on P-CSI RSs and determines if any conditions are satisfied by the conditions expressed in the Conditional CSI IE, the network entity may not recognize (e.g., know, determine) that resources configured for the UE's P-CSI reporting will not be used for that purpose; accordingly, the UE may send signaling (e.g., a message) referred to hereinafter interchangeably as "Conditional CSI Reporting Signaling" or an "indication." The term Conditional CSI Reporting Signaling was selected for ease of reference and is non-limiting. Other terms may be used to refer to the same or a similar signaling. The Conditional CSI Reporting Signaling or the indication may notify a network entity that a CSI report will be forthcoming or will not be forthcoming. In the former case, the CSI report may be forthcoming in, for example and without limitation, a quantity of slots following the slot including the Conditional CSI Reporting Signaling or in resources configured to the apparatus by the network entity for use in a next uplink of a CSI report. In the latter case, a network entity that receives Conditional CSI Reporting Signaling or an indication that the CSI report will not be forthcoming may repurpose the previously configured CSI reporting resources for another purpose. In other words, because a network entity may not know apriori that a CSI report will not be uplinked (e.g., because the condition(s) specified in a Conditional CSI IE is (are) not satisfied), the apparatus may utilize the Conditional CSI Reporting Signaling to notify the network entity that the previously configured CSI reporting resources may be utilized for another purpose.

Accordingly, in some examples described herein, an apparatus may transmit the Conditional CSI Reporting Signaling to a network entity to notify the network entity that at least one condition has been satisfied. Obtaining the Conditional CSI Reporting Signaling in these examples may inform the network entity that a CSI report (e.g., a P-CSI report) will follow K slots from the slot including the Conditional CSI Reporting Signaling. In some examples, K may be a positive non-zero integer. In some examples, K may be preconfigured (e.g., known apriori by the network entity and the apparatus). From the perspective of the apparatus, if K is preconfigured, the apparatus may autonomously transmit a CSI report in a slot "n" that is at least K slots from the Conditional CSI Reporting Signaling (i.e., transmit the CSI report without needing an instruction from the network entity to begin the transmission). In some examples, K may be based on receiving an ACK in response to transmitting the Conditional CSI Reporting Signaling.

Several non-limiting examples of the Conditional CSI Reporting Signaling are provided. In a first example, the Conditional CSI Reporting Signaling may be a scheduling request (SR). Such a scheduling request need not be modified from any SR presently employed. In this non-limiting example, the scheduling request (e.g., a regular scheduling request, not a dedicated scheduling request) would alert the network entity of the UE's intent/plan/need to send a CSI report to the network entity in K slots (measured from the slot including the SR).

In a second example, the Conditional CSI Reporting Signaling may be dedicated SR. For example, such a designated SR may be named schedulingRequest-Conditional-Report; however, other names are within the scope of the disclosure.

In a third example, the Conditional CSI Reporting Signaling may be a dedicated PRACH preamble. In this example, reception of the dedicated PRACH preamble at a network entity from a given UE would be the indication that alerts the network entity of the UE's intent/plan/need to send a CSI report to the network entity. The transmission of the CSI report could be received in K slots (measured from the slot including the dedicated PRACH preamble), or one or more dedicated PRACH preambles might be preconfigured to represent one or more different preconfigured delays (e.g., between receipt of the dedicated PRACH preamble and transmission of the CSI report).

In a fourth example, the Conditional CSI Reporting Signaling may be represented as multiplexed bits in an ongoing uplink channel. The bits may represent that the CSI report will be sent K slots following the slot including the multiplexed bits. Alternatively, the bits may themselves be an indication of the number of slots after which a CSI report will be transmitted from the UE to the network entity.

Still with reference to the Conditional CSI Reporting Signaling, in some examples, in response to receiving a repeated transmission of the Conditional CSI Reporting Signaling, the network entity may be configured to recognize that the conditions expressed in the Conditional CSI IE are being satisfied with all or some percentage of all P-CSI RS measurements. Accordingly, the network entity may be configured to establish the conditions set out in the Conditional CSI IE as a new baseline for CSI RS measurement results and may be configured to accept the conditions as permanent conditions. In other words, in examples with the Conditional CSI Reporting Signaling is sent repeatedly (e.g., at least m sent within n slots, where m and n can be specified/configured and are both positive non-zero integer values), the network entity may assume that the conditional reporting instances are permanent. According to one aspect associated with this example, the network entity may treat the conditional P-CSI reporting instances (i.e., CSI reporting resources used in response to satisfaction of conditions set forth in Conditional CSI IEs) as legacy P-CSI reporting resources.

Again, with reference to the Conditional CSI Reporting Signaling, in some examples, if at least m indication signals are sent within n slots, the apparatus may no longer send the Conditional CSI Reporting Signaling, and the UE may be expected to send P-CSI reports in every CSI reporting instance configured with the Conditional CSI IE starting from slot n+J. In some examples, J may be specified in the standards (e.g., in industry-accepted specifications), precon-figured, preestablished, or part of the reporting setting with the Conditional CSI IE.

Figure 8:
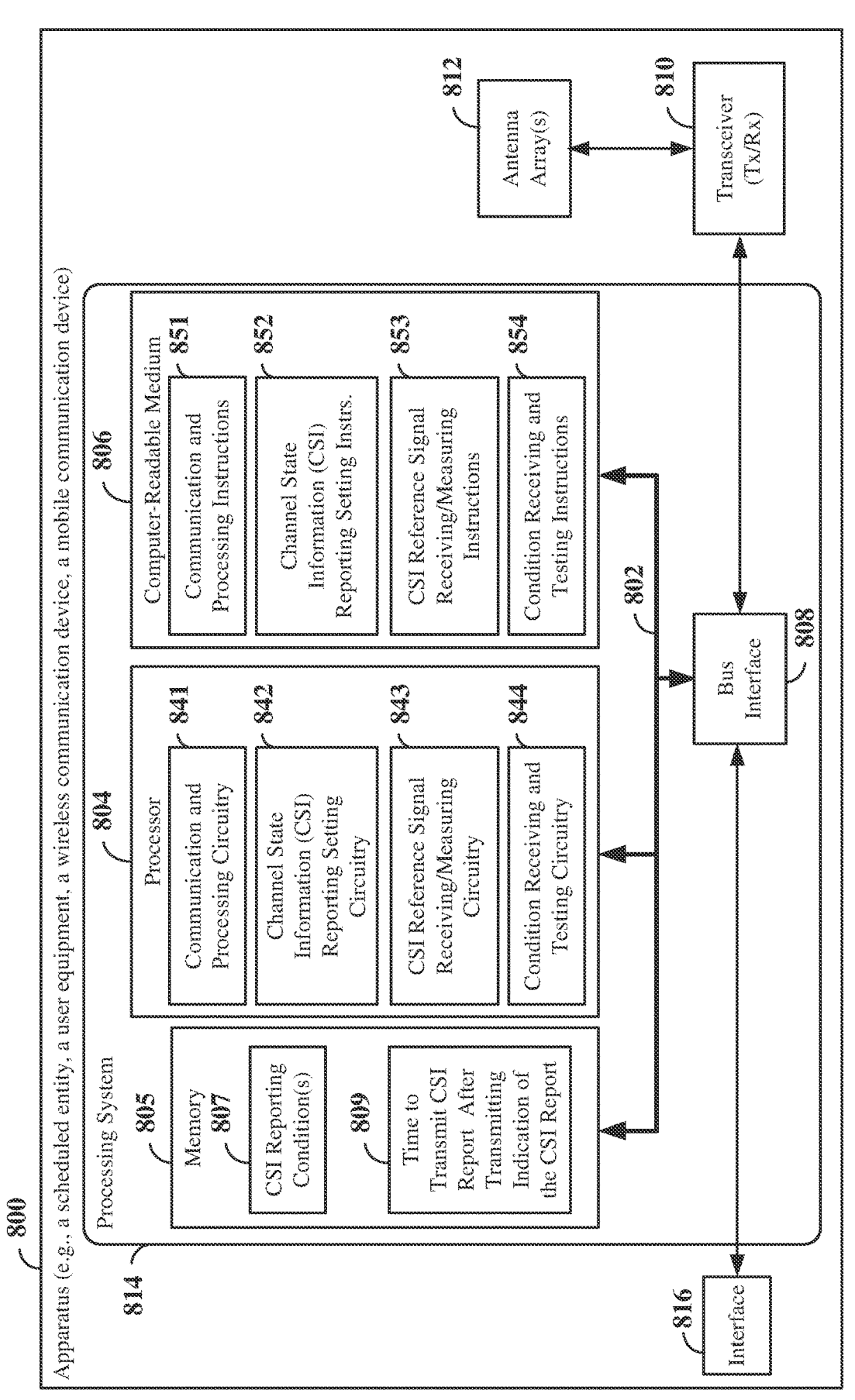
FIG. 8 is a block diagram illustrating an example of a hardware implementation of an apparatus employing one or more processing systems according to some aspects of the disclosure.

FIG. 8 is a block diagram illustrating an example of a hardware implementation of an apparatus 800 (e.g., a sched-uled entity, a user equipment, a wireless communication device, a mobile communication device) employing one or more processing systems (generally represented by process-ing system 814) according to some aspects of the disclosure. The apparatus 800 may be similar to, for example, any of the scheduled entities, user equipment, wireless communication devices, and mobile communication devices as shown and described in connection with FIGS. 1, 2, 3, and 5.

In accordance with various aspects of the disclosure, an element, any portion of an element, or any combination of elements may be implemented with a processing system 814 that includes one or more processors, generally represented by processor 804. Examples of processor 804 include micro-processors, microcontrollers, digital signal processors (DSPs), field programmable gate arrays (FPGAs), program-mable logic devices (PLDs), state machines, gated logic, discrete hardware circuits, and other suitable hardware con-figured to perform the various functionality described throughout this disclosure. In various examples, the appa-ratus 800 may be configured to perform any one or more of the functions described herein. That is, the one or more processors (generally represented by processor 804), as utilized in the apparatus 800, may be configured to, indi-vidually or collectively, implement any one or more of the methods or processes described and illustrated, for example, in FIGS. 5-7.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits, including one or more processors (represented generally by the processor 804), one or more memories (represented generally by a memory 805), and one or more computer-readable media (represented generally by the computer-readable medium 806). The bus 802 may also link various other circuits such as timing sources, peripher-als, voltage regulators, and power management circuits, which are well known to persons having ordinary skill in the art and, therefore, will not be described any further.

A bus interface 808 provides an interface between the bus 802 and a transceiver 810. The transceiver 810 may be, for example, a wireless transceiver. The transceiver 810 may be operational with multiple RATs (e.g., LTE, 5G NR, IEEE 802.11 (WiFi®), etc.). The transceiver 810 may provide respective means for communicating with various other apparatus, UEs, and core networks over a transmission medium (e.g., air interface). The transceiver 810 may be coupled to one or more antenna array(s) 812. The bus interface 808 may provide an interface between the bus 802 and a user interface 816 (e.g., keypad, display, touch screen, speaker, microphone, control features, vibration circuit/de-vice, etc.). The user interface 816 is optional and may be omitted in some examples.

One or more processors, represented individually and collectively by processor 804, may be responsible for man-aging the bus 802 and general processing, including the execution of software stored on the computer-readable medium 806. Software shall be construed broadly to mean instructions, instruction sets, code, code segments, program code, programs, subprograms, software modules, applica-tions, software applications, software packages, routines, subroutines, objects, executables, threads of execution, pro-cedures, functions, etc., whether referred to as software, firmware, middleware, microcode, hardware description language, or otherwise. The software may reside on the computer-readable medium 806. The software, when executed by the processor 804, causes the processing system 814 to perform the various processes and functions described herein for any particular apparatus.

The computer-readable medium 806 may be a non-tran-sitory computer-readable medium and may be referred to as a computer-readable storage medium or a non-transitory computer-readable medium. The non-transitory computer-readable medium may store computer-executable code (e.g., processor-executable code). The computer executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple enti-ties, including the processing system 814. The computer-readable medium 806 may be embodied in a computer program product or article of manufacture. By way of example, a computer program product or article of manu-facture may include a computer-readable medium in pack-aging materials. In some examples, the computer-readable medium 806 may be part of the memory 805. Persons having ordinary skill in the art will recognize how best to implement the described functionality presented throughout this disclo-sure depending on the particular application and the overall design constraints imposed on the overall system. The computer-readable medium 806 and/or the memory 805 may also be used for storing data that is manipulated by the processor 804 when executing software.

In some aspects of the disclosure, the processor 804 may include communication and processing circuitry 841 con-figured for various functions, including, for example, com-municating with a network entity (e.g., a scheduling entity, a base station, an aggregated or disaggregated base station, an eNB, a gNB, a TRP), another apparatus, and/or a core network. In some examples, the communication and pro-cessing circuitry 841 may include one or more hardware components that provide the physical structure that performs processes related to wireless communication (e.g., signal reception and/or signal transmission) and signal processing (e.g., processing a received signal and/or processing a signal for transmission). In some examples, the communication and processing circuitry 841 may transmit a message indi-cating that the apparatus does not implement conditional CSI reporting and may also transmit CSI reports using uplink reporting resources configured for conditional CSI reporting regardless of any condition(s) received in a CSI reporting setting. The communication and processing cir-cuitry 841 may also be configured to at least one of: receive a first signal activating the CSI report as a semi-persistent CSI report and activating the CSI report (e.g., the transmit-ting of the CSI report) in response to the at least one condition being satisfied, or receive a second signal activating the CSI report in response to the at least one condition being satisfied. The communication and processing circuitry 841 may further be configured to execute communication and processing instructions 851 (e.g., software) stored on the computer-readable medium 806 to implement one or more functions described herein.

In some aspects of the disclosure, the processor 804 may include channel state information reporting setting circuitry 842 configured for various functions, including, for example, receiving a Channel State Information (CSI) reporting setting including an identification of uplink reporting resources and at least one condition to be satisfied before the apparatus transmits a CSI report on the uplink reporting resources (e.g., at least one condition to be satisfied before the apparatus transmits may be referred to as conditions precedent). According to some aspects, the CSI reporting setting, including the at least one condition to be satisfied before the apparatus transmits the CSI report, may be provided in an information element associated with conditional CSI reporting. In some examples, the at least one condition is a plurality of conditions, and receiving the at least one condition may include receiving the at least one condition as a first condition in a list of a plurality of conditions. According to some aspects, the list of the plurality of conditions is a predetermined list identified by an identifier value, and receiving the at least one condition also includes receiving the identifier value in the CSI reporting setting. In some examples, the CSI reporting setting specifies a periodicity of CSI reports. The network entity may configure CSI reporting resources for a given apparatus (e.g., UE) experiencing rapid changes in channel quality (as indicated, for example by rapid changes to reported CSI parameters) with a higher periodicity than given to an apparatus that reports a stable channel quality (e.g., where a periodicity of 5 slots is higher that a periodicity of 10 slots) to allow for the given UE to have fast UE reporting opportunities. In some examples, a periodicity may be less than or equal to 10 slots, or less than or equal to 5 slots. The CSI reporting setting circuitry 842 may further be configured to execute CSI reporting setting instructions 852 (e.g., software) stored on the computer-readable medium 806 to implement one or more functions described herein.

In some aspects of the disclosure, the processor 804 may include CSI reference signal (RS) receiving and/or measuring circuitry 843 configured for various functions, including, for example, receiving at least one CSI-RS, and/or measuring the at least one CSI-RS. The CSI reference signal receiving and/or measuring circuitry 843 may further be configured to execute CSI reference signal receiving and/or measuring instructions 853 (e.g., software) stored on the computer-readable medium 806 to implement one or more functions described herein.

In some aspects of the disclosure, the processor 804 may include condition receiving and testing circuitry 844 configured for various functions, including, for example, testing whether a received at least one CSI-RS directly or indirectly results in the satisfaction of at least one condition (received in a CSI reporting setting or an information element (IE) including CSI reporting conditions). The condition receiving and testing circuitry 844 (e.g., in association with the transceiver 810 and antenna array(s) 812) may further transmit the CSI report using uplink reporting resources in response to the at least one CSI-RS directly or indirectly resulting in the at least one condition being satisfied.

According to some examples, the at least one condition is satisfied in response to a determination made at the apparatus of at least one of: a first change to a Rank Indicator (RI) relative to a last reported RI, a second change to a Precoding Matrix Indicator (PMI) by more than a first number of indices in a codebook relative to a last reported PMI, the first number being at least one of: preconfigured or configured in the reporting setting, or a third change to a Channel Quality Indicator (CQI) by more than a second number relative to a last reported CQI, the second number being at least one of: preconfigured or configured in the reporting setting. In some examples, the at least one condition may be at least one of: specified in the CSI reporting setting, or omitted from the CSI reporting setting and implicitly specified and stored in a memory of the apparatus, such as the memory 805 storing the CSI reporting condition(s) 807 as illustrated in FIG. 8.

In some examples, the condition receiving and testing circuitry 844 may be configured for various other functions, including, for example, transmitting an indication that a CSI report will follow the indication. In examples provided herein, the indication may be referred to as a Conditional CSI Reporting Signaling or a Conditional CSI Reporting Signaling; other names for the indication are within the scope of the disclosure. In some examples, the condition receiving and testing circuitry 844 (e.g., in association with the transceiver 810 and antenna array(s) 812) may transmit the CSI report a first preconfigured amount of time following the transmitting of the indication, or receive an acknowledgment (ACK) in response to the transmitting the indication and transmit the CSI report a second preconfigured amount of time following the receiving the ACK. In some examples, the first preconfigured amount of time and the second preconfigured amount of time are respectively expressed in slots.

According to some aspects, the indication is conveyed in at least one of: a scheduling request (e.g., a regular scheduling request, not a dedicated scheduling request), a dedicated scheduling request reserved for use in association with conditional CSI reporting, a dedicated physical random access channel (PRACH) preamble reserved for use in association with conditional CSI reporting, or bits multiplexed in an ongoing uplink channel transmission transmitted by the apparatus to the network entity.

In some examples, in response to the indication being sent at least a first number of times in less than a second number of slots, wherein the first number and the second number are respective predefined non-zero positive integers, the condition receiving and testing circuitry 844 may further be configured to: cease the transmitting of the indication; and periodically send the CSI report in the uplink reporting resources regardless of the at least one condition. According to some aspects, the periodically sending begins a specified amount of time following the second number of slots, and the specified amount of time is at least one of: specified in the CSI reporting setting, or implicitly specified and stored in a memory of the apparatus, such as the memory 805 storing a time to transmit CSI after transmitting the indication of the CSI report 809. The condition receiving and testing circuitry 844 may further be configured to execute condition receiving and testing instructions 854 (e.g., software) stored on the computer-readable medium 806 to implement one or more functions described herein.

In general, an apparatus, such as the apparatus 800, may include one or more memories (e.g., represented by memory 805), and one or more processors (e.g., represented by processor 804), the one or more processors may be configured to, individually or collectively, based at least in part on information stored in the one or more memories: perform any of the processes described herein.

FIG. 9 is a flow chart illustrating an example process 900 (e.g., a method) of wireless communication at an apparatus (e.g., a scheduled entity, a user equipment, a wireless communications device, a mobile communication device) according to some aspects of the disclosure. As described below, some or all illustrated features may be omitted in a particular implementation within the scope of the present disclosure, and some illustrated features may not be required for the implementation of all examples. In some examples, the process 900 may be carried out by the apparatus 800, as shown and described in connection with FIG. 8. The apparatus 800 may be similar to, for example, any of the scheduled entities, user equipment, wireless communications devices, and/or mobile communication devices of FIGS. 1, 2, 3, 5, and/or 8. In some examples, the process 900 may be carried out by any suitable apparatus or means for carrying out the functions or algorithm described below.

At block 902, the apparatus may receive a channel state information (CSI) reporting setting including an identification of uplink reporting resources and at least one condition to be satisfied before the apparatus transmits a CSI report on the uplink reporting resources. For example, the channel state information (CSI) reporting setting circuitry 842, as shown and described in connection with FIG. 8, may provide a means for receiving a channel state information (CSI) reporting setting including an identification of uplink reporting resources and at least one condition to be satisfied before the apparatus transmits a CSI report on the uplink reporting resources. According to some aspects of the disclosure, the CSI reporting setting including the at least one condition to be satisfied before the apparatus transmits the CSI report may be provided in an information element associated with conditional CSI reporting. The at least one condition may be received as a first condition in a list of a plurality of conditions. In some examples, the list of the plurality of conditions may be a predetermined list identified by an identifier value, and aspect of receiving the at least one condition may include: receiving the identifier value in the CSI reporting setting.

At block 904, the apparatus may receive at least one CSI reference signal (CSI-RS). For example, the CSI reference signal receiving and measuring circuitry 843, as shown and described in connection with FIG. 8, may provide a means for receiving at least one CSI reference signal (CSI-RS).

At block 906, the apparatus may transmit the CSI report using the uplink reporting resources in response to the at least one CSI-RS directly or indirectly resulting in the at least one condition being satisfied. For example, the condition receiving and testing circuitry 844, as shown and described in connection with FIG. 8, may provide a means for transmitting the CSI report using the uplink reporting resources in response to the at least one CSI-RS directly or indirectly resulting in the at least one condition being satisfied. In one example, the at least one condition is satisfied in response to a determination made at the apparatus of at least one of: a first change to a Rank Indicator (RI) relative to a last reported RI, a second change to a Pre-coding Matrix Indicator (PMI) by more than a first number of indices in a codebook relative to a last reported PMI, the first number being at least one of: preconfigured or configured in the reporting setting, or a third change to a Channel Quality Indicator (CQI) by more than a second number relative to a last reported CQI, the second number being at least one of: preconfigured or configured in the reporting setting. In some examples, the at least one condition is at least one of: specified in the CSI reporting setting, or omitted from the CSI reporting setting and implicitly specified and stored in a memory of the apparatus.

An optional step, not shown in FIG. 9, may include at least one of: receive a first signal activating the CSI report as a semi-persistent CSI report and activate the CSI report (e.g., activate the transmitting of the CSI report) in response to the at least one condition being satisfied, or receive a second signal activating the CSI report in response to the at least one condition being satisfied. For example, the communication and processing circuitry 841, as shown and described in connection with FIG. 8, may provide a means for at least one of: receiving a first signal activating the CSI report as a semi-persistent CSI report and activating the CSI report in response to the at least one condition being satisfied, or receiving a second signal activating the CSI report in response to the at least one condition being satisfied.

Figure 10:
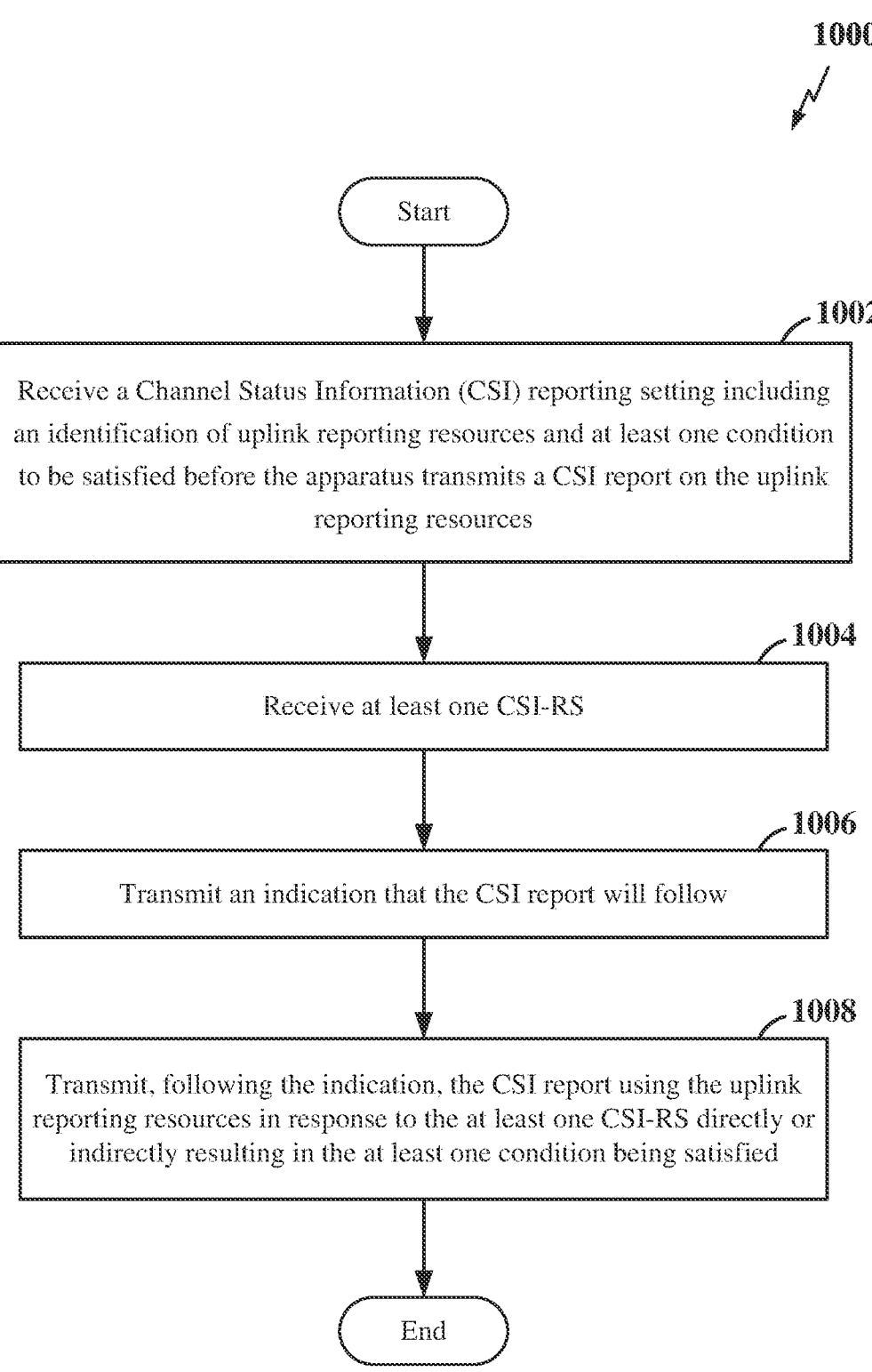
FIG. 10 is a flow chart illustrating an example process of wireless communication at an apparatus according to some aspects of the disclosure.

FIG. 10 is a flow chart illustrating an example process 1000 (e.g., a method) of wireless communication at an apparatus (e.g., a scheduled entity, a user equipment, a wireless communications device, a mobile communication device) according to some aspects of the disclosure. As described below, some or all illustrated features may be omitted in a particular implementation within the scope of the present disclosure, and some illustrated features may not be required for the implementation of all examples. In some examples, the process 1000 may be carried out by the apparatus 800, as shown and described in connection with FIG. 8. The apparatus 800 may be similar to, for example, any of the scheduled entities, user equipment, wireless communications devices, and/or mobile communication devices of FIGS. 1, 2, 3, 5, and/or 8. In some examples, the process 1000 may be carried out by any suitable apparatus or means for carrying out the functions or algorithm described below.

At block 1002, similar to block 902 of FIG. 9, the apparatus may receive a channel state information (CSI) reporting setting including an identification of uplink reporting resources and at least one condition to be satisfied before the apparatus transmits a CSI report on the uplink reporting resources. For example, the channel state information (CSI) reporting setting circuitry 842, as shown and described in connection with FIG. 8, may provide a means for receiving a channel state information (CSI) reporting setting including an identification of uplink reporting resources and at least one condition to be satisfied before the apparatus transmits a CSI report on the uplink reporting resources. According to some aspects of the disclosure, the CSI reporting setting including the at least one condition to be satisfied before the apparatus transmits the CSI report may be provided in an information element associated with conditional CSI reporting. The at least one condition may be received as a first condition in a list of a plurality of conditions. In some examples, the list of the plurality of conditions may be a predetermined list identified by an identifier value, and an aspect of receiving the at least one condition may include receiving the identifier value in the CSI reporting setting.

At block 1004, similar to block 904 of FIG. 9, the apparatus may receive at least one CSI reference signal (CSI-RS). For example, the CSI reference signal receiving and measuring circuitry 843, as shown and described in connection with FIG. 8, may provide a means for receiving at least one CSI reference signal (CSI-RS).

At block 1006, the apparatus may transmit an indication that the CSI report will follow the indication. The indication is alternatively referred to herein as the Conditional CSI Reporting Signaling. According to some examples, following the transmitting the indication that the CSI report will follow, the apparatus may at least one of: transmit the CSI report a first preconfigured amount of time following the transmitting of the indication, or receive, by the apparatus from the network entity, an acknowledgment (ACK) in response to the transmitting the indication; and transmit the CSI report a second preconfigured amount of time following the receiving the ACK. In some examples, the first preconfigured amount of time and the second preconfigured amount of time are respectively expressed in slots.

According to some aspects, the indication (also referred to herein as the Conditional CSI Reporting Signaling) is conveyed in at least one of: a scheduling request, a dedicated scheduling request reserved for use in association with conditional CSI reporting, a dedicated physical random access channel (PRACH) preamble reserved for use in association with conditional CSI reporting, or bits multiplexed in an ongoing uplink channel transmission transmitted by the apparatus to the network entity.

According to some aspects, in response to the indication being sent at least a first number of times in less than a second number of slots, where the first number and the second number are respective predefined non-zero positive integers, the method further comprises (not shown in FIG. 10): ceasing the transmitting of the indication; and periodically sending the CSI report in the uplink reporting resources regardless of the at least one condition. According to some aspects, the periodically sending begins a specified amount of time following the second number of slots, wherein the specified amount of time is at least one of: specified in the CSI reporting setting, or implicitly specified and stored in a memory of the apparatus. For example, the communication and processing circuitry 842, as shown and described in connection with FIG. 8, may provide a means for ceasing the transmitting of the indication and periodically sending the CSI report in the uplink reporting resources regardless of the at least one condition.

At block 1008, the apparatus transmits, following the indication, the CSI report using the uplink reporting resources in response to the at least one CSI-RS directly or indirectly resulting in the at least one condition being satisfied. For example, the condition receiving and testing circuitry 844, as shown and described in connection with FIG. 8, may provide a means for transmitting the CSI report using the uplink reporting resources in response to the at least one CSI-RS directly or indirectly resulting in the at least one condition being satisfied. In one example, the at least one condition is satisfied in response to a determination made at the apparatus of at least one of: a first change to a Rank Indicator (RI) relative to a last reported RI, a second change to a Pre-coding Matrix Indicator (PMI) by more than a first number of indices in a codebook relative to a last reported PMI, the first number being at least one of: preconfigured or configured in the reporting setting, or a third change to a Channel Quality Indicator (CQI) by more than a second number relative to a last reported CQI, the second number being at least one of: preconfigured or configured in the reporting setting. In some examples, the at least one condition is at least one of: specified in the CSI reporting setting, or omitted from the CSI reporting setting and implicitly specified and stored in a memory of the apparatus.

An optional step, not shown in FIG. 10, may include at least one of: receive a first signal activating the CSI report as a semi-persistent CSI report and activating the CSI (e.g., activating the transmitting the CSI report) report in response to the at least one condition being satisfied, or receive a second signal activating the CSI report in response to the at least one condition being satisfied. For example, the communication and processing circuitry 841, as shown and described in connection with FIG. 8, may provide a means for at least one of: receiving a first signal activating the CSI report as a semi-persistent CSI report and activating the CSI report in response to the at least one condition being satisfied, or receiving a second signal activating the CSI report in response to the at least one condition being satisfied.

Figure 11:
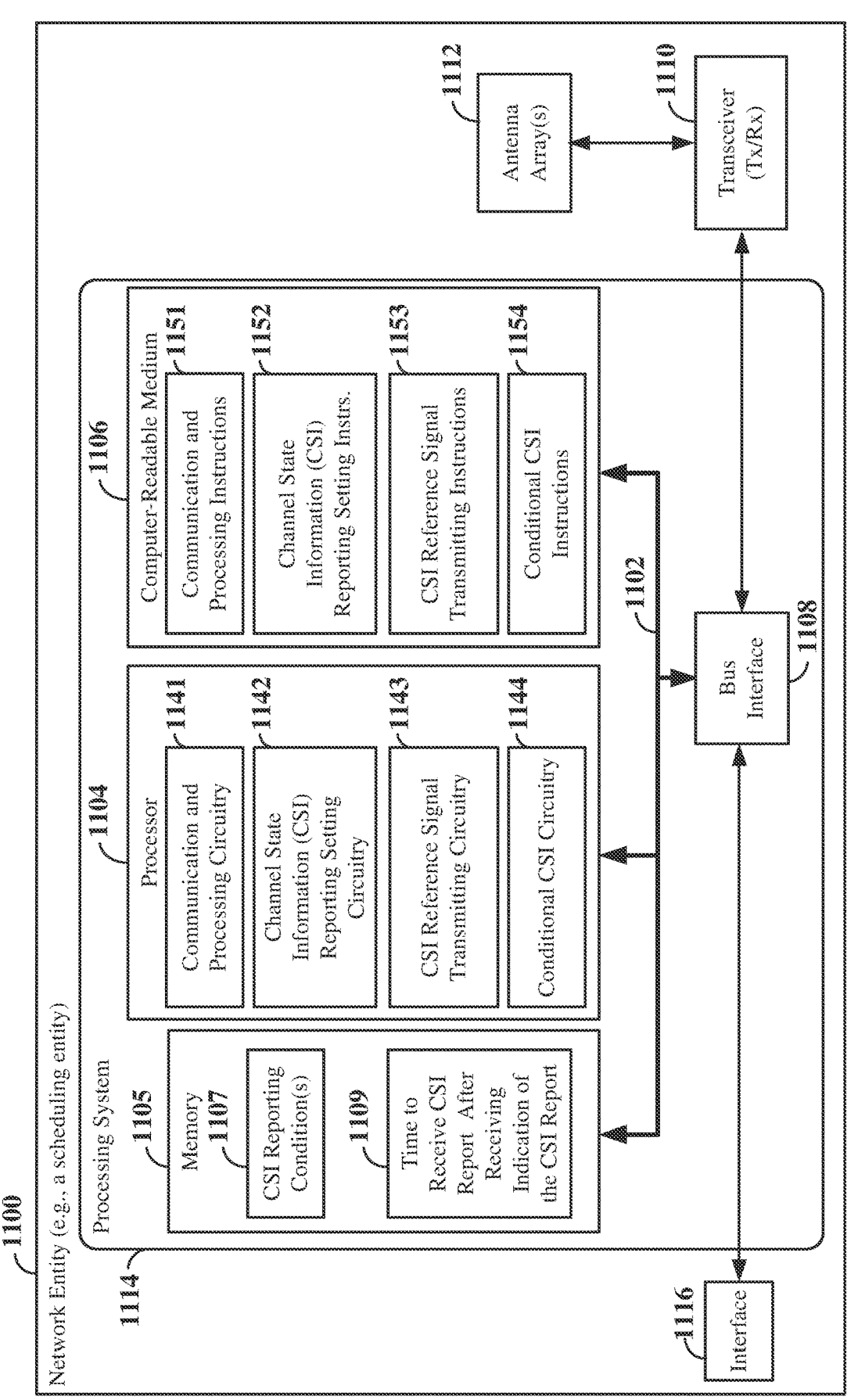
FIG. 11 is a block diagram illustrating an example of a hardware implementation of a network entity employing one or more processing systems according to some aspects of the disclosure.

FIG. 11 is a block diagram illustrating an example of a hardware implementation of a network entity 1100 (e.g., a scheduling entity, a base station, an aggregated or disaggregated base station, an eNB, a gNB, a TRP) employing one or more processing systems (generally represented by processing system 1114) according to some aspects of the disclosure. The network entity 1100 may be similar to, for example, any of the network entities, TRPs, scheduling entities, base stations, eNBs, or gNBs of FIGS. 1-3 and 5.

The processing system 1114 may be substantially the same as the processing system 814 illustrated in FIG. 8, including a bus interface 1108, a bus 1102, one or more memories, such as memory 1105, one or more processors, such as processor 1104, and one or more computer-readable mediums, such as computer-readable medium 1106, and a user interface, such as user interface 1116. Similar to the apparatus 800 of FIG. 8, the bus interface 1108 is coupled to a transceiver 1110 and an antenna array(s) 1112.

In accordance with various aspects of the disclosure, an element, or any portion of an element, or any combination of elements may be implemented with a processing system 1114 that includes one or more processors, generally represented by processor 1104. The one or more processors (generally represented by processor 1104), as utilized in the network entity 1100, may be configured to, individually or collectively, implement any one or more of the methods or processes described herein and illustrated, for example, in FIGS. 5, 6, and 7.

In some aspects of the disclosure, the processor 1104 may include communication and processing circuitry 1141 configured for various functions, including, for example, communicating with an apparatus (e.g., a scheduled entity, a user equipment, a wireless communications device, a mobile communication device), another network entity, and/or a core network. In some examples, the communication and processing circuitry 1141 may include one or more hardware components that provide the physical structure that performs processes related to wireless communication (e.g., signal reception and/or signal transmission) and signal processing (e.g., processing a received signal and/or processing a signal for transmission). In some examples, the communication and processing circuitry 1141 may receive a message indicating that an apparatus does not implement conditional CSI reporting, and may also receive CSI reports using uplink reporting resources configured for conditional CSI reporting regardless of any condition(s) transmitted in a CSI reporting setting. The communication and processing circuitry 1141 may also be configured to at least one of: transmit a first signal activating the CSI report as a semi-persistent CSI report and activating the CSI report in response to the at least one condition being satisfied, or transmit a second signal activating the CSI report in response to the at least one condition being satisfied. The communication and processing circuitry 1141 may further be configured to execute communication and processing instructions 1151 (e.g., software) stored on the computer-readable medium 1106 to implement one or more functions described herein.

In some aspects of the disclosure, the processor 1104 may include CSI reporting setting circuitry 1142 configured for various functions, including, for example, transmitting a Channel State Information (CSI) reporting setting including an identification of uplink reporting resources and at least one condition to be satisfied before an apparatus transmits a CSI report on the uplink reporting resources (e.g., at least one condition to be satisfied before the apparatus transmits may be referred to as a condition precedent). According to some aspects, the CSI reporting setting including the at least one condition to be satisfied before the apparatus transmits the CSI report may be provided in an information element associated with conditional CSI reporting. In some examples, the at least one condition is a plurality of conditions and receiving the at least one condition may include receiving the at least one condition as a first condition in a list of a plurality of conditions. According to some aspects, the list of the plurality of conditions is a predetermined list identified by an identifier value, and transmitting the at least one condition also includes transmitting the identifier value in the CSI reporting setting. In some examples, the CSI reporting setting specifies a periodicity of CSI reports. The network entity may configure CSI reporting resources for a given apparatus (e.g., UE) experiencing rapid changes in channel quality (as indicated, for example by rapid changes to reported CSI parameters) with a higher periodicity than given to an apparatus that reports a stable channel quality (e.g., where a periodicity of 5 slots is higher that a periodicity of 10 slots) to allow for the given UE to have fast UE reporting opportunities. In some examples, a periodicity may be less than or equal to 10 slots, or less than or equal to 5 slots. The CSI reporting setting circuitry 1142 may further be configured to execute CSI reporting setting instructions 1152 (e.g., software) stored on the computer-readable medium 1106 to implement one or more functions described herein.

In some aspects of the disclosure, the processor 1104 may include CSI reference signal transmitting circuitry 1143 configured for various functions, including, for example, transmitting at least one CSI-RS. The CSI reference signal transmitting circuitry 1143 may further be configured to execute CSI reference signal transmitting instructions 1153 (e.g., software) stored on the computer-readable medium 1106 to implement one or more functions described herein.

In some aspects of the disclosure, the processor 1104 may include conditional CSI circuitry 1144 configured for various functions, including, for example, generating and transmitting a CSI Conditional IE with the at least one condition to be tested by an apparatus to determine whether a received at least one CSI-RS directly or indirectly results in the satisfaction of at least one condition (received in a CSI reporting setting or an information element (IE) including CSI reporting conditions). The conditional CSI circuitry 1144 (e.g., in association with the transceiver 1110 and antenna array(s) 1112) may further receive the CSI report using uplink reporting resources in response to the at least one CSI-RS directly or indirectly resulting in the at least one condition being satisfied.

According to some examples, the at least one condition is satisfied in response to a determination made at the apparatus of at least one of: a first change to a Rank Indicator (RI) relative to a last reported RI, a second change to a Precoding Matrix Indicator (PMI) by more than a first number of indices in a codebook relative to a last reported PMI, the first number being at least one of: preconfigured or configured in the reporting setting, or a third change to a Channel Quality Indicator (CQI) by more than a second number relative to a last reported CQI, the second number being at least one of: preconfigured or configured in the reporting setting. In some examples, the at least one condition may be at least one of: specified in the CSI reporting setting, or omitted from the CSI reporting setting and implicitly specified and stored in a memory of the network entity, such as the memory 1105 storing the CSI reporting condition(s) 1107 as illustrated in FIG. 11.

In some examples, the conditional CSI circuitry 1144 may be configured for various other functions, including, for example, receiving an indication that a CSI report will follow the indication. In examples provided herein, the indication may be referred to as a Conditional CSI Reporting Signal or Conditional CSI Reporting Signaling; other names for the indication are within the scope of the disclosure. In some examples, the conditional CSI circuitry 1144 (e.g., in association with the transceiver 1110 and antenna array(s) 1112) may receive the CSI report a first preconfigured amount of time following the reception of the indication, or transmit an acknowledgment (ACK) in response to the receiving the indication and receive the CSI report a second preconfigured amount of time following the transmitting the ACK. In some examples, the first preconfigured amount of time and the second preconfigured amount of time are respectively expressed in slots.

According to some aspects, the indication is conveyed in at least one of: a scheduling request (e.g., a regular scheduling request, not a dedicated scheduling request), a dedicated scheduling request reserved for use in association with conditional CSI reporting, a dedicated physical random access channel (PRACH) preamble reserved for use in association with conditional CSI reporting, or bits multiplexed in an ongoing uplink channel transmission received by the network entity from the apparatus.

In some examples, in response to the indication being received at least a first number of times in less than a second number of slots, where the first number and the second number are respective predefined non-zero positive integers, the conditional CSI circuitry 1144 may further be configured to: cease the receiving of the indication; and periodically receive the CSI report in the uplink reporting resources regardless of the at least one condition. According to some aspects, the periodically receiving begins a specified amount of time following the second number of slots, and the specified amount of time is at least one of: specified in the CSI reporting setting, or implicitly specified and stored in a memory of the network entity, such as the memory 1105 storing a time to receive CSI after receiving the indication of the CSI report 1109. The conditional CSI circuitry 1144 may further be configured to execute conditional CSI instructions 1154 (e.g., software) stored on the computer-readable medium 1106 to implement one or more functions described herein.

In general, an apparatus, such as the network entity 1100, may include one or more memories (e.g., represented by memory 1105) and one or more processors (e.g., represented by processor 1104), the one or more processors may be configured to, individually or collectively, based at least in part on information stored in the one or more memories: perform any of the processes described herein.

Figure 12:
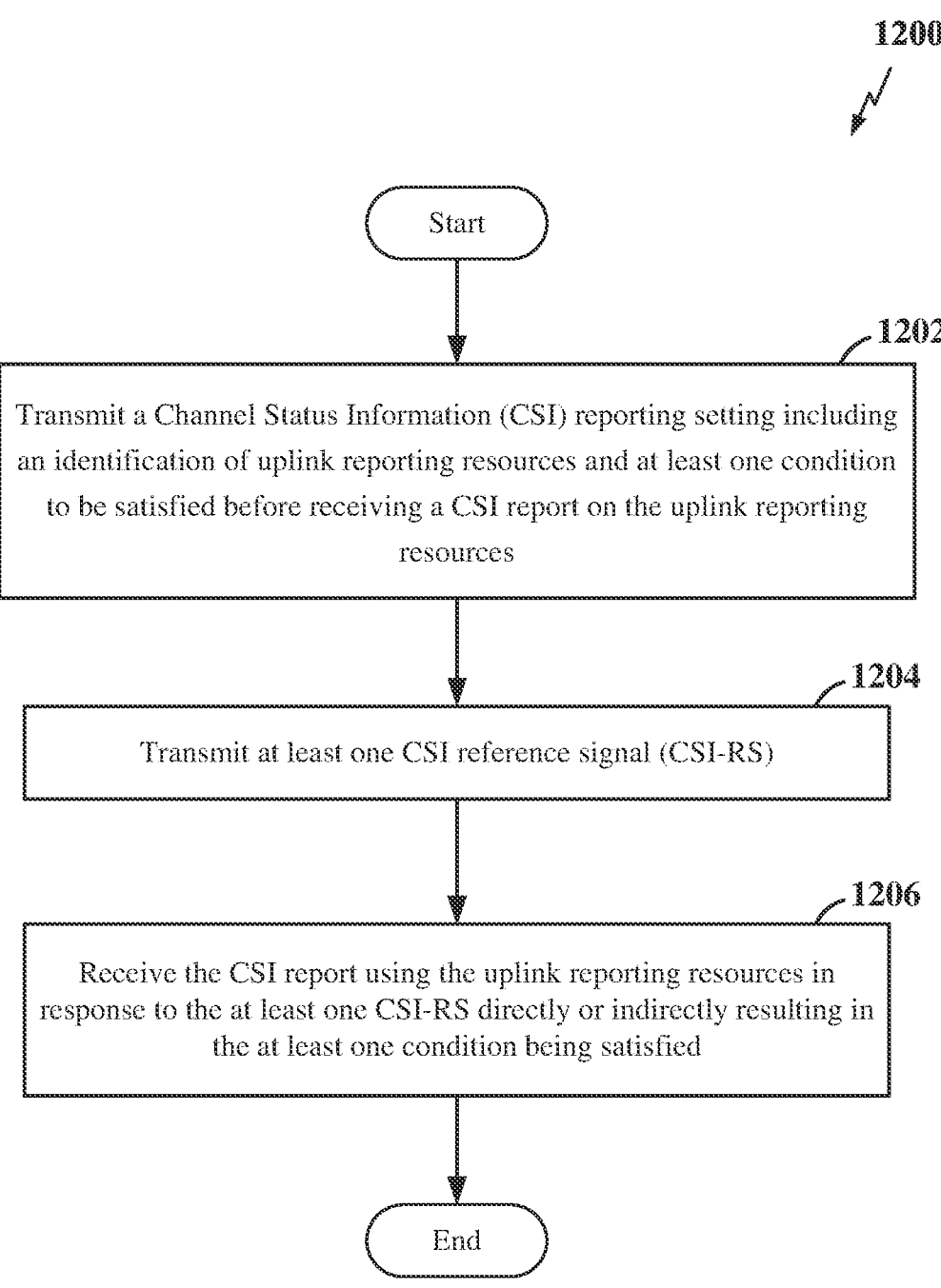
FIG. 12 is a flow chart illustrating an example process of wireless communication at a network entity according to some aspects of the disclosure.

FIG. 12 is a flow chart illustrating an example process 1200 (e.g., a method) of wireless communication at a network entity (e.g., a scheduling entity, a base station, an aggregated or disaggregated base station, an eNB, a gNB, a TRP) according to some aspects of the disclosure. As described below, some or all illustrated features may be omitted in a particular implementation within the scope of the present disclosure, and some illustrated features may not be required for the implementation of all examples. In some examples, the process 1200 may be carried out by the network entity 1100, as shown and described in connection with FIG. 11. The network entity 1100 may be similar to, for example, any of the scheduling entities, base stations, aggregated or disaggregated base stations, eNBs, gNBs, TRPs of FIGS. 1, 2, 3, 5, and/or 11. In some examples, the process 1200 may be carried out by any suitable network entity or means for carrying out the functions or algorithm described below.

At block 1202, the network entity may transmit a channel state information (CSI) reporting setting including an identification of uplink reporting resources and at least one condition to be satisfied before an apparatus transmits a CSI report on the uplink reporting resources to the network entity. For example, the channel state information (CSI) reporting setting circuitry 1142, as shown and described in connection with FIG. 11, may provide a means for transmitting a channel state information (CSI) reporting setting including an identification of uplink reporting resources and at least one condition to be satisfied before an apparatus transmits a CSI report on the uplink reporting resources to the network entity. According to some aspects of the disclosure, the CSI reporting setting, including the at least one condition to be satisfied before the network entity receives the CSI report may be provided in an information element associated with conditional CSI reporting. The at least one condition may be transmitted as a first condition in a list of a plurality of conditions. In some examples, the list of the plurality of conditions may be a predetermined list identified by an identifier value, and an aspect of transmitting the at least one condition may include transmitting the identifier value in the CSI reporting setting.

At block 1204, the network entity may transmit at least one CSI reference signal (CSI-RS). For example, the CSI reference signal transmitting circuitry 1143, as shown and described in connection with FIG. 11, may provide a means for transmitting at least one CSI reference signal (CSI-RS).

At block 1206, the network entity may receive the CSI report using the uplink reporting resources in response to the at least one CSI-RS directly or indirectly resulting in the at least one condition being satisfied. For example, the conditional CSI circuitry 1144, as shown and described in connection with FIG. 11, may provide a means for receiving the CSI report using the uplink reporting resources in response to the at least one CSI-RS directly or indirectly resulting in the at least one condition being satisfied. In one example, the at least one condition is satisfied in response to a determination made at the apparatus of at least one of: a first change to a Rank Indicator (RI) relative to a last reported RI, a second change to a Pre-coding Matrix Indicator (PMI) by more than a first number of indices in a codebook relative to a last reported PMI, the first number being at least one of: preconfigured or configured in the reporting setting, or a third change to a Channel Quality Indicator (CQI) by more than a second number relative to a last reported CQI, the second number being at least one of: preconfigured or configured in the reporting setting. In some examples, the at least one condition is at least one of: specified in the CSI reporting setting, or omitted from the CSI reporting setting and implicitly specified and stored in a memory of the network entity.

An optional step, not shown in FIG. 12, may include at least one of: transmit a first signal activating the CSI report as a semi-persistent CSI report and activating the CSI report (e.g., activating the transmitting of the DCI report to the network entity from the apparatus) in response to the at least one condition being satisfied, or transmit a second signal activating the CSI report in response to the at least one condition being satisfied. For example, the communication and processing circuitry 1141, as shown and described in connection with FIG. 11, may provide a means for at least one of: transmitting a first signal activating the CSI report as a semi-persistent CSI report and activating the CSI report in response to the at least one condition being satisfied, or transmitting a second signal activating the CSI report in response to the at least one condition being satisfied.

Figure 13:
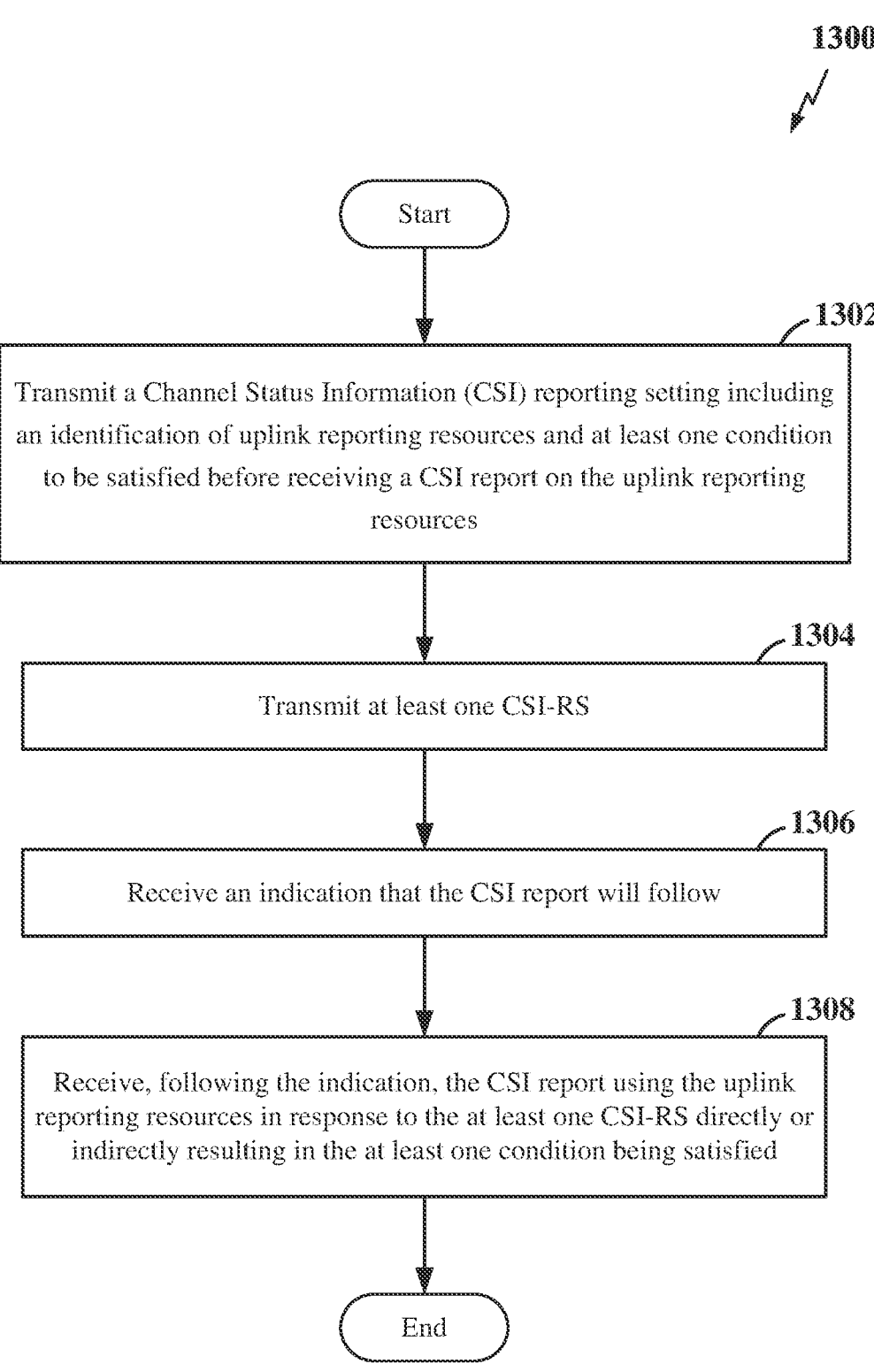
FIG. 13 is a flow chart illustrating an example process of wireless communication at a network entity according to some aspects of the disclosure.

FIG. 13 is a flow chart illustrating an example process 1300 (e.g., a method) of wireless communication at a network entity (e.g., a scheduling entity, a base station, an aggregated or disaggregated base station, an eNB, a gNB, a TRP) according to some aspects of the disclosure. As described below, some or all illustrated features may be omitted in a particular implementation within the scope of the present disclosure, and some illustrated features may not be required for the implementation of all examples. In some examples, the process 1300 may be carried out by the network entity 1100, as shown and described in connection with FIG. 11. The network entity 1100 may be similar to, for example, any of the scheduling entities, base stations, aggregated or disaggregated base stations, eNBs, gNBs, TRPs of FIGS. 1, 2, 3, 5, and/or 11. In some examples, the process 1300 may be carried out by any suitable network entity or means for carrying out the functions or algorithm described below.

At block 1302, similar to block 1202 of FIG. 12, the network entity may transmit a channel state information (CSI) reporting setting including an identification of uplink reporting resources and at least one condition to be satisfied before the network entity receives a CSI report on the uplink reporting resources. For example, the channel state information (CSI) reporting setting circuitry 1142, as shown and described in connection with FIG. 11, may provide a means for transmitting a channel state information (CSI) reporting setting including an identification of uplink reporting resources and at least one condition to be satisfied before the network entity receives a CSI report on the uplink reporting resources. According to some aspects of the disclosure, the CSI reporting setting, including the at least one condition to be satisfied before the network entity receives the CSI report may be provided in an information element associated with conditional CSI reporting. The at least one condition may be transmitted as a first condition in a list of a plurality of conditions. In some examples, the list of the plurality of conditions may be a predetermined list identified by an identifier value, and aspect of transmitting the at least one condition may include transmitting the identifier value in the CSI reporting setting.

At block 1304, similar to block 1204 of FIG. 12, the network entity may transmit at least one CSI reference signal (CSI-RS). For example, the CSI reference signal transmitting circuitry 1143, as shown and described in connection with FIG. 11, may provide a means for transmitting at least one CSI reference signal (CSI-RS).

At block 1306, the network entity may receive an indication that the CSI report will follow the indication. The indication is alternatively referred to herein as the Conditional CSI Reporting Signaling. According to some examples, following the receiving of the indication that the CSI report will follow, the network entity may at least one of: receive the CSI report a first preconfigured amount of time following the receiving of the indication, or transmit, by the network entity to an apparatus, an acknowledgment (ACK) in response to the receiving the indication; and receive the CSI report a second preconfigured amount of time following the transmitting the ACK. In some examples, the first preconfigured amount of time and the second preconfigured amount of time are respectively expressed in slots.

According to some aspects, the indication (also referred to herein as the Conditional CSI Reporting Signaling) is conveyed in at least one of: a scheduling request, a dedicated scheduling request reserved for use in association with conditional CSI reporting, a dedicated physical random access channel (PRACH) preamble reserved for use in association with conditional CSI reporting, or bits multiplexed in an ongoing uplink channel transmission transmitted by the apparatus to the network entity.

According to some aspects, in response to the indication being received at least a first number of times in less than a second number of slots, where the first number and the second number are respective predefined non-zero positive integers, the method further comprises (not shown in FIG. 13): ceasing the receiving of the indication; and periodically receiving the CSI report in the uplink reporting resources regardless of the at least one condition. According to some aspects, the periodically receiving begins a specified amount of time following the second number of slots, wherein the specified amount of time is at least one of: specified in the CSI reporting setting, or implicitly specified and stored in a memory of the network entity. For example, the communication and processing circuitry 1141, as shown and described in connection with FIG. 11, may provide a means for ceasing the receiving of the indication; and periodically receiving the CSI report in the uplink reporting resources regardless of the at least one condition.

At block 1308, the network entity receives, following the indication, the CSI report using the uplink reporting resources in response to the at least one CSI-RS directly or indirectly resulting in the at least one condition being satisfied. For example, the conditional CSI circuitry 1144, as shown and described in connection with FIG. 11, may provide a means for receiving the CSI report using the uplink reporting resources in response to the at least one CSI-RS directly or indirectly resulting in the at least one condition being satisfied. In one example, the at least one condition is satisfied in response to a determination made at an apparatus of at least one of: a first change to a Rank Indicator (RI) relative to a last reported RI, a second change to a Pre-coding Matrix Indicator (PMI) by more than a first number of indices in a codebook relative to a last reported PMI, the first number being at least one of: preconfigured or configured in the reporting setting, or a third change to a Channel Quality Indicator (CQI) by more than a second number relative to a last reported CQI, the second number being at least one of: preconfigured or configured in the reporting setting. In some examples, the at least one condition is at least one of: specified in the CSI reporting setting, or omitted from the CSI reporting setting and implicitly specified and stored in a memory of the network entity.

An optional step, not shown in FIG. 13, may include at least one of: transmit a first signal activating the CSI report as a semi-persistent CSI report and activating the CSI report (e.g., activating the transmitting the CSI report) in response to the at least one condition being satisfied, or transmit a second signal activating the CSI report in response to the at least one condition being satisfied. For example, the communication and processing circuitry 1141, as shown and described in connection with FIG. 11, may provide a means for at least one of: transmitting a first signal activating the CSI report as a semi-persistent CSI report and activating the CSI report in response to the at least one condition being satisfied, or transmitting a second signal activating the CSI report in response to the at least one condition being satisfied.

In accordance with various aspects of the disclosure, an element, or any portion of an element, or any combination of elements may be implemented with a processing system 1114 that includes one or more processors, generally represented by processor 1104. The one or more processors (generally represented by processor 1104), as utilized in the network entity 1100, may be configured to, individually or collectively, implement any one or more of the methods or processes described herein and illustrated, for example, in FIGS. 5, 6, 7, 12, and 13.

Of course, in the above examples, the circuitry included in the processor 804 of FIG. 8 and/or the processor 1104 of FIG. 11 is merely provided as an example. Other means for carrying out the described processes or functions may be included within various aspects of the present disclosure, including but not limited to the instructions stored in the computer-readable medium 806 of FIG. 8 and/or the computer-readable medium 1106 of FIG. 11 or any other suitable apparatus or means described in any one of the FIGS. 1-3, 5, 8, and/or 11 utilizing, for example, the processes and/or algorithms described herein in relation to FIGS. 5, 6, 7, 9, 10, 12, and/or 13.

The following provides an overview of aspects of the present disclosure:

Aspect 1: A method at an apparatus, comprising: receiving a Channel State Information (CSI) reporting setting including an identification of uplink reporting resources and at least one condition to be satisfied before the apparatus transmits a CSI report on the uplink reporting resources; receiving at least one CSI reference signal (CSI-RS); and transmitting the CSI report using the uplink reporting resources in response to the at least one CSI-RS directly or indirectly resulting in the at least one condition being satisfied.

Aspect 2: The method of aspect 1, wherein the CSI reporting setting including the at least one condition to be satisfied before the apparatus transmits the CSI report is provided in an information element associated with conditional CSI reporting.

Aspect 3: The method of aspects 1 or 2, wherein the at least one condition is satisfied in response to a determination made at the apparatus of at least one of: a first change to a Rank Indicator (RI) relative to a last reported RI, a second change to a Pre-coding Matrix Indicator (PMI) by more than a first number of indices in a codebook relative to a last reported PMI, the first number being at least one of: preconfigured or configured in the reporting setting, or a third change to a Channel Quality Indicator (CQI) by more than a second number relative to a last reported CQI, the second number being at least one of: preconfigured or configured in the reporting setting.

Aspect 4: The method of any of aspects 1 through 3, wherein the at least one condition is at least one of: specified in the CSI reporting setting, or omitted from the CSI reporting setting and implicitly specified and stored in a memory of the apparatus.

Aspect 5: The method of any of aspects 1 through 4, further comprising at least one of: receiving a first signal activating the CSI report as a semi-persistent CSI report and activating the CSI report in response to the at least one condition being satisfied, or receiving a second signal activating the CSI report in response to the at least one condition being satisfied.

Aspect 6: The method of any of aspects 1 through 5, wherein prior to transmitting the CSI report, the method further comprises: transmitting, by the apparatus to a network entity, an indication that the CSI report will follow the indication.

Aspect 7: The method of aspect 6, further comprising at least one of: transmitting the CSI report a first preconfigured amount of time following the transmitting of the indication, or receiving, by the apparatus from the network entity, an acknowledgment (ACK) in response to the transmitting the indication; and transmitting the CSI report a second preconfigured amount of time following the receiving the ACK.

Aspect 8: The method of any of aspects 1 through 7, wherein the indication is conveyed in at least one of: a scheduling request, a dedicated scheduling request reserved for use in association with conditional CSI reporting, a dedicated physical random access channel (PRACH) preamble reserved for use in association with conditional CSI reporting, or bits multiplexed in an ongoing uplink channel transmission transmitted by the apparatus to the network entity.

Aspect 9: The method of any of aspects 1 through 8, wherein, in response to the indication being sent at least a first number of times in less than a second number of slots and the first number and the second number are respective predefined non-zero positive integers, the method further comprises: ceasing the transmitting of the indication; and periodically sending the CSI report in the uplink reporting resources regardless of the at least one condition.

Aspect 10: The method of aspect 9, wherein the periodically sending begins a specified amount of time following the second number of slots and the specified amount of time is at least one of: specified in the CSI reporting setting, or implicitly specified and stored in a memory of the apparatus.

Aspect 11: An apparatus, comprising: one or more memories; and one or more processors being configured to, individually or collectively, based at least in part on information stored in the one or more memories: receive a Channel State Information (CSI) reporting setting including an identification of uplink reporting resources and at least one condition to be satisfied before the apparatus transmits a CSI report on the uplink reporting resources; receive at least one CSI reference signal (CSI-RS); and transmit the CSI report using the uplink reporting resources in response to the at least one CSI-RS directly or indirectly resulting in the at least one condition being satisfied.

Aspect 12: The apparatus of aspect 11, wherein the one or more processors are further configured to at least one of: receive a first signal activating the CSI report as a semi-persistent CSI report and activating the CSI report in response to the at least one condition being satisfied, or receive a second signal activating the CSI report in response to the at least one condition being satisfied.

Aspect 13: The apparatus of aspects 11 or 12, wherein prior to transmitting the CSI report, the one or more processors are further configured to: transmit, by the apparatus to a network entity, an indication that the CSI report will follow the indication.

Aspect 14: The apparatus of aspect 13, wherein the one or more processors are further configured to: transmit the CSI report a first preconfigured amount of time following the transmitting of the indication, or receive, by the apparatus from the network entity, an acknowledgment (ACK) in response to the transmitting the indication; and transmit the CSI report a second preconfigured amount of time following the receiving the ACK.

Aspect 15: The apparatus of any of aspects 11 through 14, wherein, in response to the indication being sent at least a first number of times in less than a second number of slots and the first number and the second number are respective predefined non-zero positive integers, the one or more processors are further configured to: cease the transmitting of the indication; and periodically send the CSI report in the uplink reporting resources regardless of the at least one condition.

Aspect 16: A method at a network entity, comprising: transmitting a Channel State Information (CSI) reporting setting including an identification of uplink reporting resources and at least one condition to be satisfied before receiving a CSI report on the uplink reporting resources; transmitting at least one CSI reference signal (CSI-RS); and receiving the CSI report using the uplink reporting resources in response to the transmitting the at least one CSI-RS.

Aspect 17: The method of aspect 16, wherein the CSI reporting setting including the at least one condition to be satisfied before receiving the CSI report is provided in an information element associated with conditional CSI reporting.

Aspect 18: The method of aspects 16 or 17, wherein the at least one condition is satisfied by at least one of: a first change to a Rank Indicator (RI) relative to a last reported RI, a second change to a Pre-coding Matrix Indicator (PMI) by more than a first number of indices in a codebook relative to a last reported PMI, the first number being at least one of: preconfigured or configured in the reporting setting, or a third change to a Channel Quality Indicator (CQI) by more than a second number relative to a last reported CQI, the second number being at least one of: preconfigured or configured in the reporting setting.

Aspect 19: The method of any of aspects 16 through 18, wherein the at least one condition is at least one of: specified in the CSI reporting setting, or omitted from the CSI reporting setting and implicitly specified and stored in a memory of the network entity.

Aspect 20: The method of any of aspects 16 through 19, further comprising at least one of: transmitting a first signal activating the CSI report as a semi-persistent CSI report and activating the CSI report in response to the at least one condition being satisfied, or transmitting a second signal activating the CSI report in response to the at least one condition being satisfied.

Aspect 21: The method of any of aspects 16 through 20, further comprising: receiving, by the network entity from an apparatus, an indication that the CSI report will follow the indication.

Aspect 22: The method of aspect 21, further comprising at least one of: receiving, by the network entity from the apparatus, the CSI report a first preconfigured amount of time following the receiving of the indication, or transmitting, by the network entity to the apparatus, an acknowledgment (ACK) in response to the receiving the indication; and receiving, by the network entity from the apparatus, the CSI report a second preconfigured amount of time following the transmitting the ACK.

Aspect 23: The method of any of aspects 16 through 22, wherein the indication is conveyed in at least one of: a scheduling request, a dedicated scheduling request reserved for use in association with conditional CSI reporting, a dedicated physical random access channel (PRACH) preamble reserved for use in association with conditional CSI reporting, or bits multiplexed in an ongoing uplink channel transmission received by the network entity from the apparatus.

Aspect 24: The method of any of aspects 16 through 23, wherein, in response to the indication being received at least a first number of times in less than a second number of slots and the first number and the second number are respective predefined non-zero positive integers, the method further comprises: periodically receiving the CSI report in the uplink reporting resources regardless of the at least one condition.

Aspect 25: The method of aspect 24, wherein the periodically receiving begins a specified amount of time following the second number of slots and the specified amount of time is at least one of: specified in the CSI reporting setting, or implicitly specified and stored in a memory of the network entity.

Aspect 26: A network entity, comprising: one or more memories; and one or more processors being configured to, individually or collectively, based at least in part on information stored in the one or more memories: transmit a Channel State Information (CSI) reporting setting including an identification of uplink reporting resources and at least one condition to be satisfied before receiving a CSI report on the uplink reporting resources; transmit at least one CSI reference signal (CSI-RS); and receive the CSI report using the uplink reporting resources in response to the transmitting the at least one CSI-RS.

Aspect 27: The network entity of aspect 26, wherein the one or more processors are further configured to at least one of: transmit a first signal activating the CSI report as a semi-persistent CSI report and activating the CSI report in response to the at least one condition being satisfied, or transmit a second signal activating the CSI report in response to the at least one condition being satisfied.

Aspect 28: The network entity of aspects 26 or 27, wherein the one or more processors are further configured to: receive, by the network entity from an apparatus, an indication that the CSI report will follow the indication.

Aspect 29: The network entity of aspect 28, wherein the one or more processors are further configured to at least one of: receive, by the network entity from the apparatus, the CSI report a first preconfigured amount of time following the receiving of the indication, or transmit, by the network entity to the apparatus, an acknowledgment (ACK) in response to the receiving the indication; and receive, by the network entity from the apparatus, the CSI report a second preconfigured amount of time following the transmitting the ACK.

Aspect 30: The network entity of any of aspects 26 through 29, wherein, in response to the indication being received at least a first number of times in less than a second number of slots and the first number and the second number are respective predefined non-zero positive integers, the one or more processors are further configured to: periodically receive the CSI report in the uplink reporting resources regardless of the at least one condition.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features, and/or functions illustrated in FIGS. 1-13 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein. While some examples illustrated herein depict only time and frequency domains, additional domains such as a spatial domain are also contemplated in this disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one"

unless specifically so stated, but rather "one or more." Unless specifically stated otherwise, the term "some" refers to one or more.

The word "obtain" as used herein may mean, for example, acquire, calculate, construct, derive, determine, receive, and/or retrieve. The preceding list is exemplary and not limiting. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

As used herein, the term "determine" or "determining" encompasses a wide variety of actions and, therefore, "determining" can include calculating, computing, processing, deriving, investigating, looking up (such as via looking up in a table, a database, or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing, and other similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Similarly, a phrase referring to A and/or B may include A only, B only, or a combination of A and B.

As used herein, "based on" is intended to be interpreted in the inclusive sense, unless otherwise explicitly indicated. For example, "based on" may be used interchangeably with "based at least in part on," "associated with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A method at an apparatus, comprising:
   receiving a Channel State Information (CSI) reporting setting including an identification of uplink reporting resources and at least one condition to be satisfied before the apparatus transmits a CSI report on the uplink reporting resources;
   receiving at least one CSI reference signal (CSI-RS); and
   transmitting the CSI report using the uplink reporting resources in response to the at least one CSI-RS directly or indirectly resulting in the at least one condition being satisfied, wherein prior to transmitting the CSI report, the method further comprises:
   transmitting, by the apparatus to a network entity, an indication that the CSI report will follow the indication, wherein, in response to the indication being sent at least a first number of times in less than a second number of slots and the first number of times and the second number of slots are respective predefined non-zero positive integers, the method further comprises:
   ceasing the transmitting of the indication; and
   periodically sending the CSI report in the uplink reporting resources regardless of the at least one condition.

2. The method of claim 1, wherein the CSI reporting setting including the at least one condition to be satisfied before the apparatus transmits the CSI report is provided in an information element associated with conditional CSI reporting.

3. The method of claim 1, wherein the at least one condition is satisfied in response to a determination made at the apparatus of at least one of:

a first change to a Rank Indicator (RI) relative to a last reported RI, a second change to a Pre-coding Matrix Indicator (PMI) by more than a first number of indices in a codebook relative to a last reported PMI, the first number of indices being at least one of: preconfigured or configured in the reporting setting, or a third change to a Channel Quality Indicator (CQI) by more than a second number relative to a last reported CQI, the second number being at least one of: preconfigured or configured in the reporting setting.

4. The method of claim 1, wherein the at least one condition is at least one of:

specified in the CSI reporting setting, or omitted from the CSI reporting setting and implicitly specified and stored in a memory of the apparatus.

5. The method of claim 1, further comprising at least one of:

receiving a first signal activating the CSI report as a semi-persistent CSI report and activating the CSI report in response to the at least one condition being satisfied, or receiving a second signal activating the CSI report in response to the at least one condition being satisfied.

6. The method of claim 1, further comprising at least one of:

transmitting the CSI report a first preconfigured amount of time following the transmitting of the indication, or receiving, by the apparatus from the network entity, an acknowledgment (ACK) in response to the transmitting the indication; and transmitting the CSI report a second preconfigured amount of time following the receiving the ACK.

7. The method of claim 1, wherein the indication is conveyed in at least one of:

a scheduling request, a dedicated scheduling request reserved for use in association with conditional CSI reporting, a dedicated physical random access channel (PRACH) preamble reserved for use in association with conditional CSI reporting, or bits multiplexed in an ongoing uplink channel transmission transmitted by the apparatus to the network entity.

8. The method of claim 1, wherein the periodically sending begins a specified amount of time following the second number of slots and the specified amount of time is at least one of:

specified in the CSI reporting setting, or implicitly specified and stored in a memory of the apparatus.

9. An apparatus, comprising:

one or more memories; and one or more processors being configured to, individually or collectively, based at least in part on information stored in the one or more memories:

receive a Channel State Information (CSI) reporting setting including an identification of uplink reporting resources and at least one condition to be satisfied before the apparatus transmits a CSI report on the uplink reporting resources;

receive at least one CSI reference signal (CSI-RS); and transmit the CSI report using the uplink reporting resources in response to the at least one CSI-RS directly or indirectly resulting in the at least one condition being satisfied, wherein prior to transmitting the CSI report, the one or more processors are further configured to:

transmit, by the apparatus to a network entity, an indication that the CSI report will follow the indication, wherein, in response to the indication being sent at least a first number of times in less than a second number of slots and the first number of times and the second number of slots are respective predefined non-zero positive integers, the one or more processors are further configured to:

cease the transmitting of the indication; and periodically send the CSI report in the uplink reporting resources regardless of the at least one condition.

10. The apparatus of claim 9, wherein the one or more processors are further configured to at least one of:

receive a first signal activating the CSI report as a semi-persistent CSI report and activating the CSI report in response to the at least one condition being satisfied, or receive a second signal activating the CSI report in response to the at least one condition being satisfied.

11. The apparatus of claim 9, wherein the one or more processors are further configured to:

transmit the CSI report a first preconfigured amount of time following the transmitting of the indication, or receive, by the apparatus from the network entity, an acknowledgment (ACK) in response to the transmitting the indication; and transmit the CSI report a second preconfigured amount of time following the receiving the ACK.

12. The apparatus of claim 9, wherein the indication is conveyed in at least one of:

a scheduling request, a dedicated scheduling request reserved for use in association with conditional CSI reporting, a dedicated physical random access channel (PRACH) preamble reserved for use in association with conditional CSI reporting, or bits multiplexed in an ongoing uplink channel transmission transmitted by the apparatus to the network entity.

13. The apparatus of claim 9, wherein the periodically sending begins a specified amount of time following the second number of slots and the specified amount of time is at least one of:

specified in the CSI reporting setting, or implicitly specified and stored in the one or more memories of the apparatus.

14. A method at a network entity, comprising:

transmitting a Channel State Information (CSI) reporting setting including an identification of uplink reporting resources and at least one condition to be satisfied before receiving a CSI report on the uplink reporting resources;

transmitting at least one CSI reference signal (CSI-RS);

receiving the CSI report using the uplink reporting resources in response to the transmitting the at least one CSI-RS; and receiving, by the network entity from an apparatus, an indication that the CSI report will follow the indication, wherein, in response to the indication being received at least a first number of times in less than a second number of slots and the first number and the second number are respective predefined non-zero positive integers, the method further comprises:

periodically receiving the CSI report in the uplink
reporting resources regardless of the at least one
condition.

15. The method of claim 14, wherein the CSI reporting
setting including the at least one condition to be satisfied
before receiving the CSI report is provided in an information
element associated with conditional CSI reporting.

16. The method of claim 14, wherein the at least one
condition is satisfied by at least one of:

a first change to a Rank Indicator (RI) relative to a last
reported RI, a second change to a Pre-coding Matrix Indicator (PMI)
by more than a first number of indices in a codebook
relative to a last reported PMI, the first number of
indices being at least one of: preconfigured or config-
ured in the reporting setting, or a third change to a Channel Quality Indicator (CQI) by
more than a second number relative to a last reported
CQI, the second number being at least one of: precon-
figured or configured in the reporting setting.

17. The method of claim 14, wherein the at least one
condition is at least one of:

specified in the CSI reporting setting, or omitted from the CSI reporting setting and implicitly
specified and stored in a memory of the network entity.

18. The method of claim 14, further comprising at least
one of:

transmitting a first signal activating the CSI report as a
semi-persistent CSI report and activating the CSI report
in response to the at least one condition being satisfied,
or transmitting a second signal activating the CSI report in
response to the at least one condition being satisfied.

19. The method of claim 14, further comprising at least
one of:

receiving, by the network entity from the apparatus, the
CSI report a first preconfigured amount of time follow-
ing the receiving of the indication, or transmitting, by the network entity to the apparatus, an
acknowledgment (ACK) in response to the receiving
the indication; and receiving, by the network entity from the apparatus, the
CSI report a second preconfigured amount of time
following the transmitting the ACK.

20. The method of claim 14, wherein the indication is
conveyed in at least one of:

a scheduling request, a dedicated scheduling request reserved for use in asso-
ciation with conditional CSI reporting, a dedicated physical random access channel (PRACH)
preamble reserved for use in association with condi-
tional CSI reporting, or bits multiplexed in an ongoing uplink channel transmis-
sion received by the network entity from the apparatus.

21. The method of claim 14, wherein the periodically
receiving begins a specified amount of time following the
second number of slots and the specified amount of time is
at least one of:

specified in the CSI reporting setting, or implicitly specified and stored in a memory of the net-
work entity.

22. A network entity, comprising:

one or more memories; and one or more processors being configured to, individually
or collectively, based at least in part on information
stored in the one or more memories:

transmit a Channel State Information (CSI) reporting
setting including an identification of uplink reporting
resources and at least one condition to be satisfied
before receiving a CSI report on the uplink reporting
resources;

transmit at least one CSI reference signal (CSI-RS);

receive the CSI report using the uplink reporting
resources in response to the transmitting the at least
one CSI-RS; and receive, by the network entity from an apparatus, an
indication that the CSI report will follow the indi-
cation, wherein, in response to the indication being
received at least a first number of times in less than
a second number of slots and the first number of
times and the second number of slots are respective
predefined non-zero positive integers, the one or
more processors are further configured to:

periodically receive the CSI report in the uplink
reporting resources regardless of the at least one
condition.

23. The network entity of claim 22, wherein the one or
more processors are further configured to at least one of:

transmit a first signal activating the CSI report as a
semi-persistent CSI report and activating the CSI report
in response to the at least one condition being satisfied,
or transmit a second signal activating the CSI report in
response to the at least one condition being satisfied.

24. The network entity of claim 22, wherein the one or
more processors are further configured to at least one of:

receive, by the network entity from the apparatus, the CSI
report a first preconfigured amount of time following
the receiving of the indication, or transmit, by the network entity to the apparatus, an
acknowledgment (ACK) in response to the receiving
the indication; and receive, by the network entity from the apparatus, the CSI
report a second preconfigured amount of time follow-
ing the transmitting the ACK.

25. The apparatus of claim 22, wherein the indication is
conveyed in at least one of:

a scheduling request, a dedicated scheduling request reserved for use in asso-
ciation with conditional CSI reporting, a dedicated physical random access channel (PRACH)
preamble reserved for use in association with condi-
tional CSI reporting, or bits multiplexed in an ongoing uplink channel transmis-
sion received by the network entity from the apparatus.

26. The apparatus of claim 22, wherein the periodically
receiving begins a specified amount of time following the
second number of slots and the specified amount of time is
at least one of:

specified in the CSI reporting setting, or implicitly specified and stored in a memory of the net-
work entity.

* * * * *